United States Patent [19]

Eickmann

[11] Patent Number: 4,504,029
[45] Date of Patent: Mar. 12, 1985

[54] FLUID MOTOR DRIVEN MULTI PROPELLER AIRCRAFT

[76] Inventor: Karl Eickmann, 2420 Isshiki, Hayama-machi, Kanagawa-ken, Japan

[21] Appl. No.: 533,073

[22] Filed: Sep. 16, 1983

Related U.S. Application Data

[60] Division of Ser. No. 121,186, Feb. 13, 1980, Pat. No. 4,405,103, Ser. No. 91,651, Nov. 5, 1979, and Ser. No. 973,780, Nov. 27, 1978, and a continuation-in-part of Ser. No. 425,747, Sep. 28, 1982, and Ser. No. 110,157, Jan. 7, 1980, said Ser. No. 91,651, is a division of Ser. No. 842,979, Oct. 13, 1977, which is a continuation of Ser. No. 610,871, Sep. 8, 1975, abandoned, which is a division of Ser. No. 416,237, Nov. 15, 1973, abandoned, which is a division of Ser. No. 131,782, Apr. 6, 1971, Pat. No. 3,790,105, which is a continuation-in-part of Ser. No. 782,349, Dec. 9, 1968, abandoned, which is a continuation-in-part of Ser. No. 551,023, May 18, 1966, abandoned, and Ser. No. 328,395, Dec. 5, 1963, Pat. No. 3,320,898, said Ser. No. 973,780, is a continuation-in-part of Ser. No. 760,006, Nov. 17, 1977, abandoned, which is a continuation-in-part of Ser. No. 487,272, Jul. 10, 1974, Pat. No. 4,009,849, which is a continuation-in-part of Ser. No. 104,676, Mar. 8, 1971, Pat. No. 3,823,898, said Ser. No. 425,747, is a continuation-in-part of Ser. No. 973,780, Ser. No. 760,006, and Ser. No. 487,272.

[51] Int. Cl.³ .............................................. B64C 11/00
[52] U.S. Cl. ..................................... 244/54; 244/7 R; 244/65
[58] Field of Search .................... 244/7 R, 7 C, 17.11, 244/17.23, 53 R, 56, 55, 66, 60, 123, 124, 54, 48, 65

[56] References Cited

U.S. PATENT DOCUMENTS

| 1,726,062 | 8/1929 | Gilman | 244/56 |
|---|---|---|---|
| 2,514,639 | 7/1950 | Haack | 244/56 |
| 2,514,822 | 7/1950 | Wolfe | 244/60 |
| 2,650,045 | 8/1953 | Hunt | 244/60 |
| 2,708,081 | 5/1955 | Dobson | 244/7 C |
| 2,926,869 | 3/1960 | Sullivan | 244/56 |
| 2,936,968 | 5/1960 | Mazzitelli | 244/7 C |
| 2,988,152 | 6/1961 | Katzenberger et al. | 244/123 |
| 3,166,271 | 1/1965 | Zuck | 244/66 |
| 3,181,810 | 5/1965 | Olson | 244/7 R |
| 3,253,806 | 5/1966 | Eickmann | 244/17.23 |
| 3,614,029 | 10/1971 | Eickmann | 244/60 |
| 3,779,487 | 12/1973 | Ashton et al. | 244/123 |

FOREIGN PATENT DOCUMENTS

| 158433 | 4/1940 | Austria | 244/123 |
|---|---|---|---|
| 966032 | 9/1950 | France | 244/7 R |
| 1322169 | 7/1973 | United Kingdom | 244/7 R |

*Primary Examiner*—Galen L. Barefoot

[57] ABSTRACT

An aircraft has a pair of wing portions with propellers of a propeller pair which are driven and synchronized by a fluid transmission between the power plant and the propellers. A fluid line structure keeps most components of the craft together and consists preferredly of three pipes which are also utilized to carry the driving fluid to and from the motors, to hold the motors and to hold the wings. The take over of a plurality of functions by the interior pipe structure reduces weight and secures safe and economic operation of the craft. The aircraft is provided with a propeller and motor arrangement that is retractable into a slot formed in the front portion of the wings.

3 Claims, 41 Drawing Figures

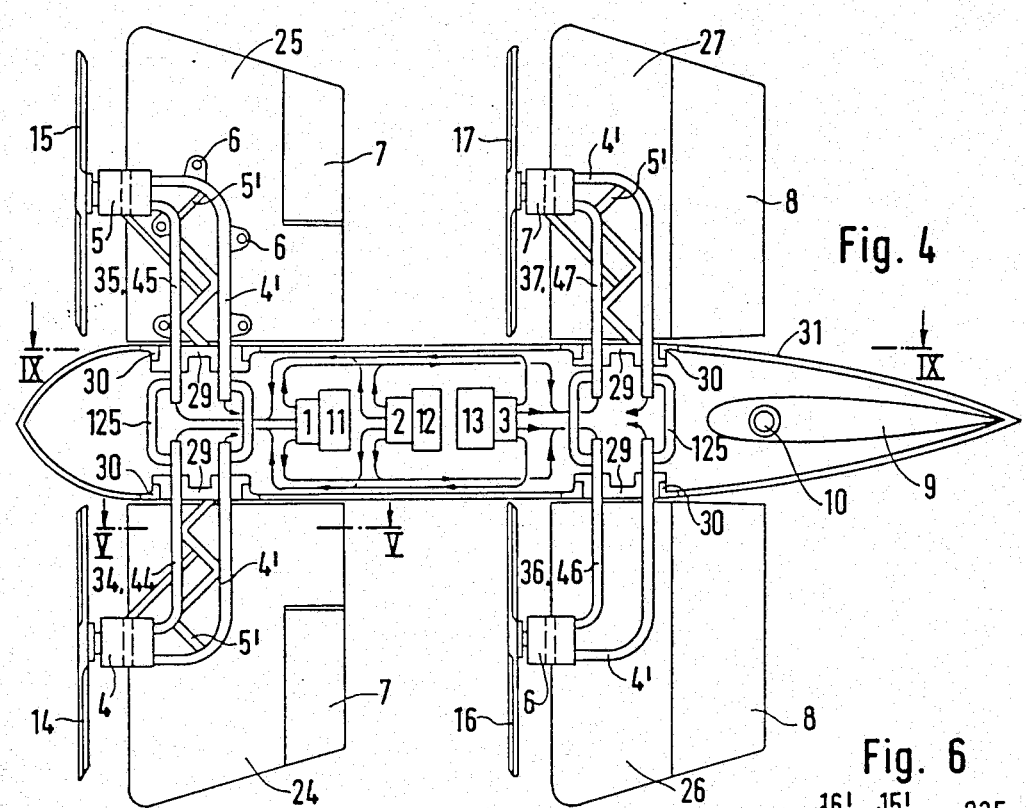
Fig. 4
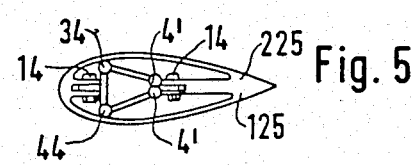
Fig. 5
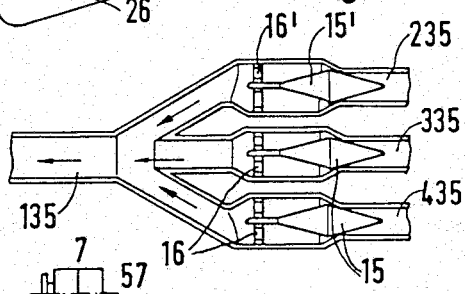
Fig. 6
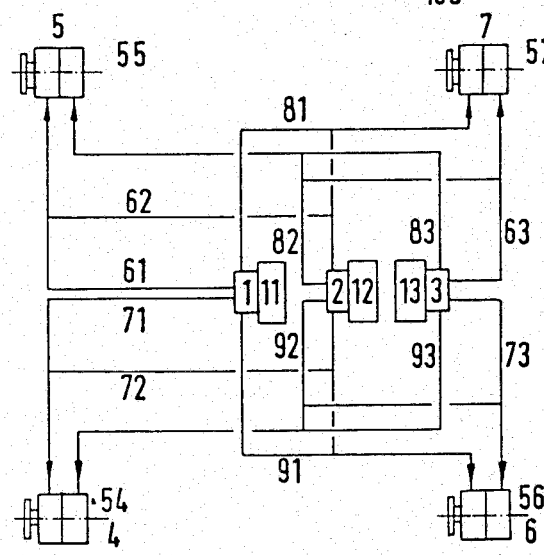
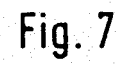
Fig. 7

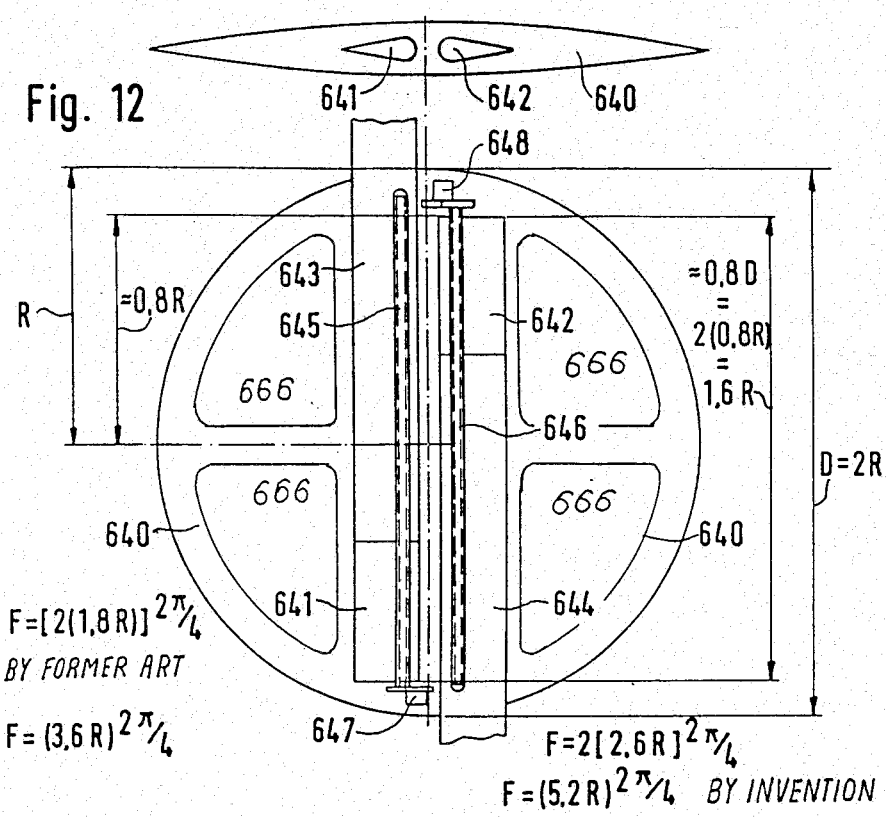
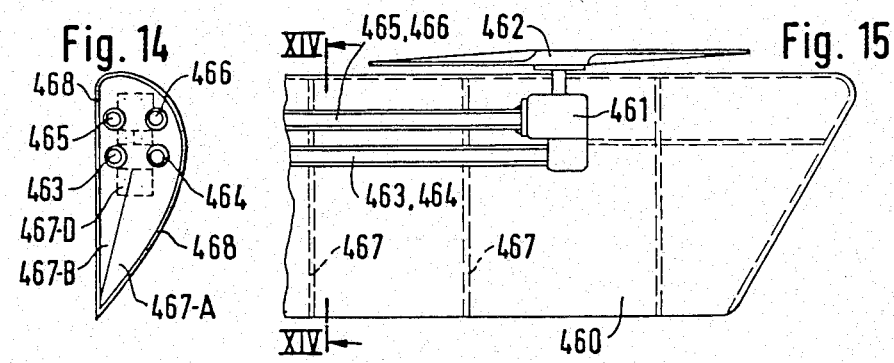
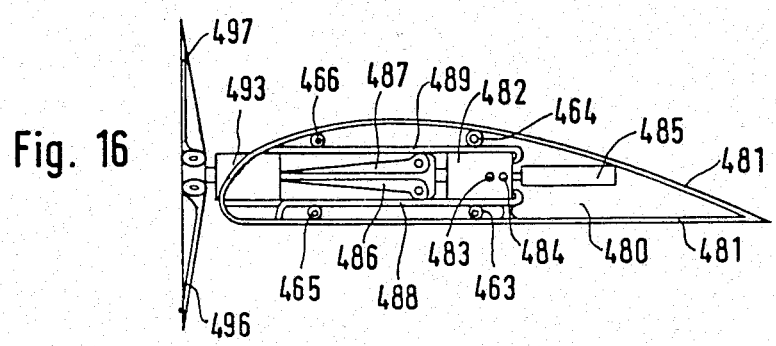

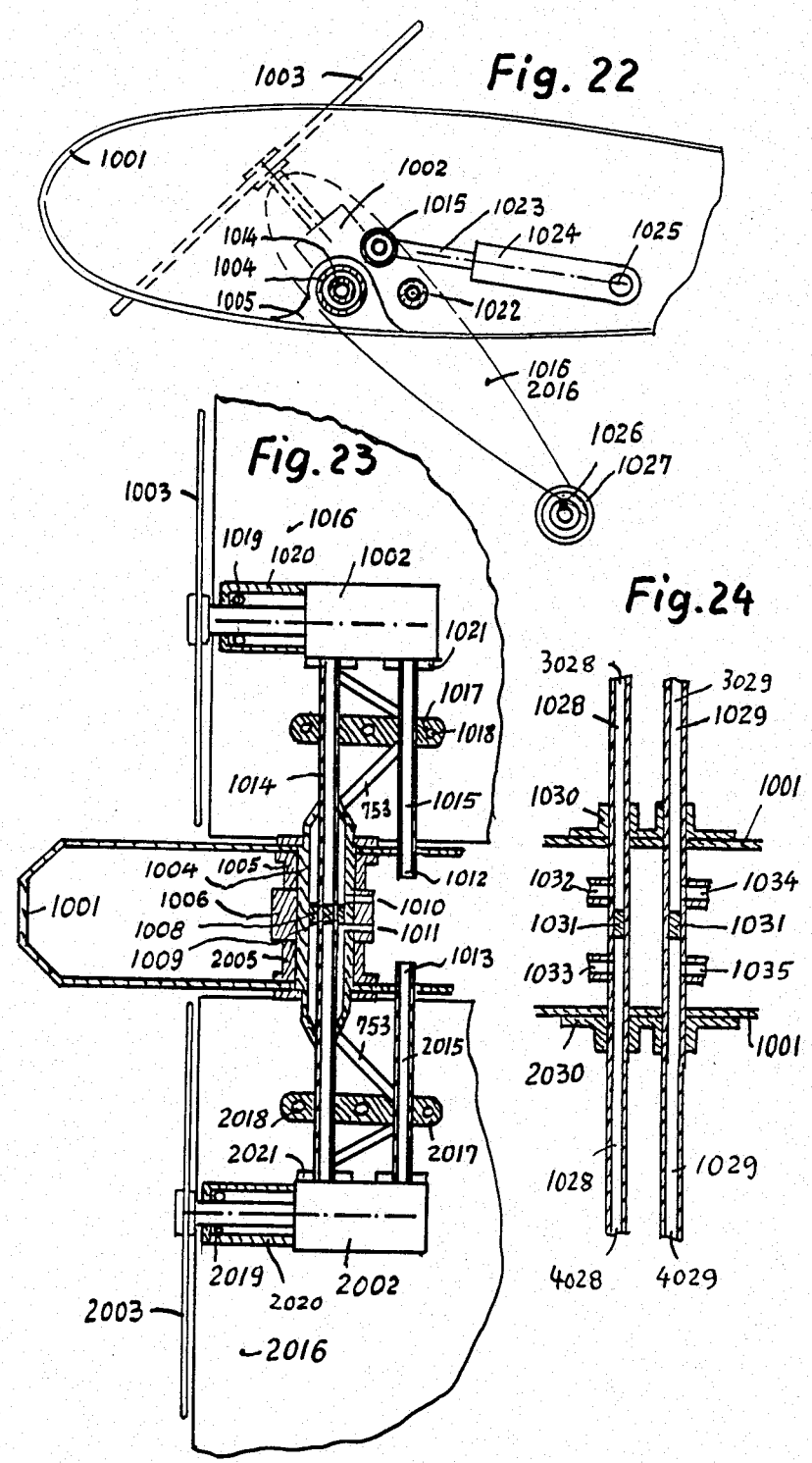

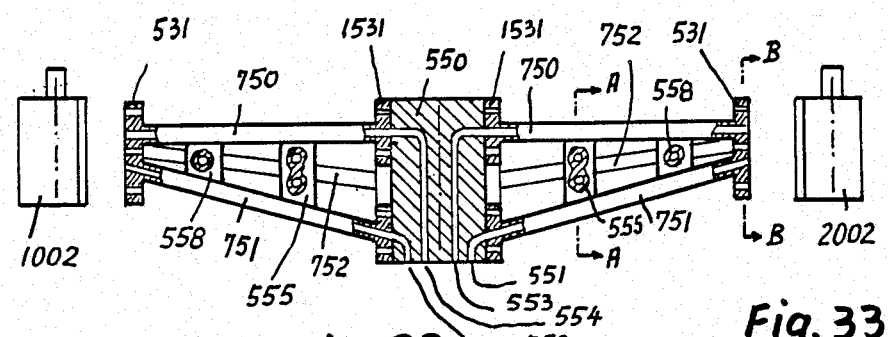
Fig. 31
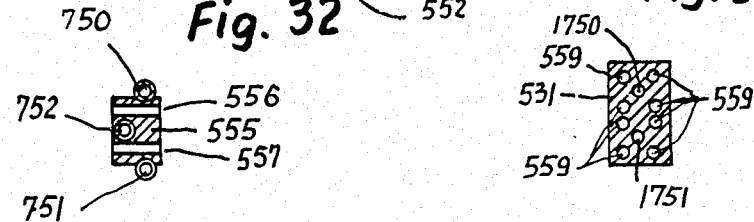
Fig. 32
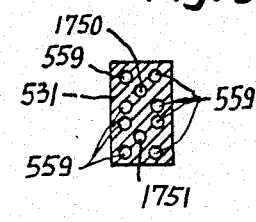
Fig. 33
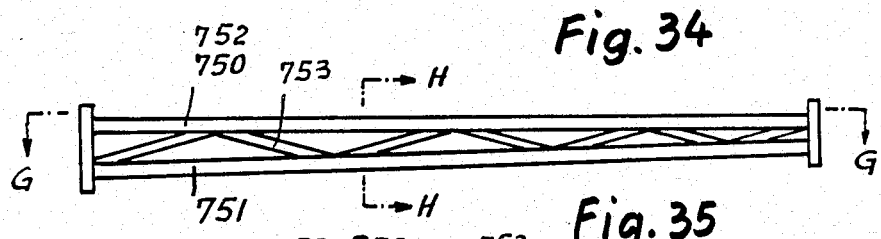
Fig. 34
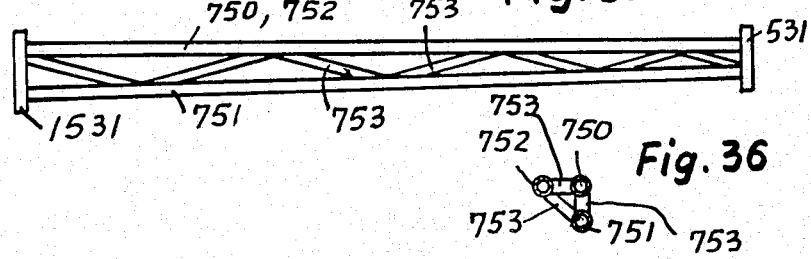
Fig. 35
Fig. 36

FLUID MOTOR DRIVEN MULTI PROPELLER AIRCRAFT

This is also a Divisional application of my co-pending application, Ser. No. 091,651, which was filed on Nov. 05, 1979 and which is now under appeal.

The mentioned application 091,651 is a divisional of my earlier patent application Ser. No. 842,979; filed on Oct. 13, 1977. Application Ser. No. 842,979 is a CFR 1.60 continuation application of application Ser. No. 610,871, filed on Sept. 8, 1975, which is now abandoned. Application Ser. No. 610,871 was a divisional patent application of my earlier patent application Ser. No. 416,237, filed on Nov. 15, 1973, now abandoned. Application Ser. No. 416,237 was a divisional application of my still earlier patent application Ser. No. 131,782 which was filed on Apr. 6, 1971 and which is now U.S. Pat. No. 3,790,105, which issued on Feb. 5, 1974. Application Ser. No. 131,782 was a continuation in part of the still earlier application Ser. No. 782,349 which was filed on Dec. 9, 1968 and which is now abandoned. Application Ser. No. 782,349 was a continuation in part application of the still earlier patent application Ser. Nos. 328,395 of Dec. 5, 1963 and of Ser. No. 551,023 of May 18, 1966 which is now abandoned, while the mentioned application Ser. No. 328,395 is now U.S. Pat. No. 3,320,898, which issued on May 23, 1967.

This is also a continuation in part application of my co-pending application Ser. No. 425,747, filed on Sept. 28, 1982 as a continuation in part application of Ser. Nos. 973,780; 760,006 and 487,272 of 05.

This is also a divisional patent application of a portion of my co-pending application Ser. No. 121,186, which was filed on Feb. 13, 1980 which issued as U.S. Pat. No. 4,405,103 on Sept. 20, 1983.

Priorities of the above mentioned earlier applications are claimed for this present application at least in part.

BACKGROUND OF THE INVENTION

(a) FIELD OF THE INVENTION

This application relates to aircraft or vertically and horizontally flying aircraft, which are driven by propellers, which in turn are driven by hydraulic or other fluid motors. The invention relates further to such aircraft which have at least two pairs of tiltable or pivotable wings. In such craft each pair of wings consists of a left side and a right side wing portion. Each wing-portion has at least one propeller which is pivoted together with the wing. In substantial vertical propeller axes and wing-position, the craft can vertically or almost vertically take off and land. At substantially horizontal propeller axes and wing-position the aircraft can fly on wings forwardly. The heretofore known fields of inventions did however never propose an aircraft of the present type.

(b) DESCRIPTION OF THE PRIOR ART

Horizontally moving propellerdriven vehicle or aircraft are derived partially from the applications whereof the present application is a respective continuation or divisional application. For example, they are shown in my U.S. Pat. Nos. 3,790,105; 3,823,898; 9,983,833 or 4,126,522. Other air-borne vehicles, for example those, where hydraulic fluid motors are driving propellers which may be fastened on pipes, are for example, my U.S. Pat. Nos. 3,211,399; 3,253,806; 3,345,016; 3,497,162 or 3,614,029. My newest aircraft patent 4,136,845 whereof the priority is claimed too, discloses retractable propellers in the wings. All these heretofore mentioned patents have hydraulic drives for the propellers.

Differently therefrom there have been attempts to develop vertically take off and landing aircraft with pivotable wings, wherein the propellers are driven by engines directly or by mechanical transmissions which are extended from the engine(s) in the body through the respective wing portion to the propellers.

VTOL=vertically taking off and landing aircraft, as far as the engines to drive the propellers are fastened to the respective wing or portion of the wing have been build and published reports about their capabilities exist. At least one type is build by a commercial aircraft company and the airforce has successfully build and let be published reports about heavy types of such propeller driven VTOL aircraft. The Jet-engine driven VTOL fighter planes are not related to the present invention, because they are not propeller-driven.

More closer related to the present invention, than the aircraft with engines mounted on the wings, are those, where one or more engine(s) is (are) mounted in the body of the aircraft and mechanic transmission means are extended from the respective engine in the body to the propeller(s) on the wings. The most closely related aircraft of the last mentioned types are for example shown in the following patents:

U.S. Pat. U.S. No. 3,181,810—OLSON, whereof also a Canadian patent exists, shows two pairs of wing portions which each have a propeller. Plural engines are mounted in the body and drive a transmission means in common, which is a mechanical transmission. The mechanic transmission extends from the engines through a portion of the body and through portions of the wings to the propellers to drive them. While the patent describes the arrangement in great detail, it also discloses, that a great number of parts are required, which together make a very heavy weight. The wings are needing additional structures and bearings must be provided for the propellers to hold them. The patent fails to give an overall weight-lift balance of the craft. It can not be seen, how much the craft would be able to lift after it has to carry all the many heavy parts of the transmission, wing structure and propeller shaft bearings.

U.S. Pat. No. 2,708,081—DOBSON shows an aircraft with each one wing portion extending to the right and left of the body. The wings are however borne on pipes which are inside of each other and the drive shaft is full and inside of the inner pipe. The pipes, which bear the wings are borne in separated bearings on each side of the body of the craft. The there disclosed must be either of big diameter to be able to carry the load of the wings and the thrusts of the propellers, which would require heavy weight of the pipes. Or there would have to be additional structures of heavy weight to make the wings stable. In addition the bearing capacity of the single bearings for each side wardly extending wing-pipe set can be only limited. The craft in addition needs still to many heavy parts to become economical and the patent fails also, in the same way, as Olson, to disclose an overall lift-weight balance.

Other former art exists in several patents, which show specific details, but which do not appear to be closely related to the present invention. Those are, for example; U.S. Pat. No. 1,858,011, ZERBI discloses double-co-axial propeller drive means which are of mechanical nature. U.S. Pat. No. 3,797,783—KISOVEC discloses propellers on the wing tips, which are mechanically driven and which can be pivoted from vertical to horizontal. U.S. Pat. No. 3,514,052—Mc.KEOWN discloses pivotable propellers on fixed wings, namely on the tips of the wing portions. U.S. Pat. No. 3,165,280—SHAO—TANG LEE discloses horizontally-vertically collapsible wing portions. U.S. Pat. No. 2,988,152—Katzenberger discloses pipes in wings, which are exclusively laterally of each other and which lead compressed air or gases to the ports on the wings on the ends of the wings. There the ports are bend in a rearward direction to supply a forward thrust to the aircraft by the rearwards directed outflows of the air or gases. GERMAN PATENT No. 1,299,535—HILLER also discloses pivotable wings, which carry propeller-driving engines. U.S. Pat. No. 3,861,623—FRUECHTE discloses two propellers which are synchronised for their rotary speeds by a hydrostatic transmission means or synchronization means. GERMAN Pat. No. 1,275,874—YOUNG again discloses propeller driving engines on the tips of pivotable wings.

HOWEVER; all of the mentioned patents of the former art are failing to give an exactly examinable overall lift-weight balance.

They all, as far as they are for pivotable wings, are however demonstrating the direction of the affords of the former art. They were exclusively directed to mechanical transmission means or to propeller-driving engines on the wings.

It is applicant's discovery by the present invention, that the devices of the former art are uneconomic for vertical take off aircraft for the average citizen with an average income and budget. The craft of the former art are too expensive in operation. Because their too heavy weight requires to expensive, strong engines of little weight. Because the required parts in the craft are too many and the sum of their weights is to heavy to permit an inexpensive engine of only limited horsepower with small fuel consumption.

SUMMARY OF THE INVENTION:

The invention aims, to overcome the limitations and difficulties of the former art and to provide a very safe vertically taking off and landing, but horizontally flying aircraft for the average person or for economic use in industrial or higher capacity applications.

The invention discloses in great detail a preferred embodiment of the invention and in it the invention does away the many heavy parts of the former art. It applies only very reliable and simple means of little weight. In its aim to spare the heavy operation costs of the fuel consuming heavy weight machines of the former art, the invention starts off with a clear analysis of what is important for the vertical take off and landing and what applies at the later forward flight on the wings.

At common aircraft-technology it was assumed, that it would be the most economic way to drive a propeller by mounting the propeller directly onto a flange of a crankshaft of the aircraft engine. By setting the propeller directly onto the crankshaft of the engine losses of transmissions should be prevented. Because, when a transmission is used between an engine and a means driven by the engine, there will be losses in the transmission.

This assumption of the common aircraft technology, which makes at the first glimpse the impression of being absolutely true—simply because it is true that a transmission has losses—is however, as the inventor of this application found, under certain circumstances a diastrous error, which has considerably prevented the advancement of flight-technology.

This will be visible at hand of FIG. 1 of this specification.

It is generally known from Newtons law of force, that the force equals the mass multiplied by the acceleration, according to equation: (1)

$$\text{Force} = \text{Mass} \times \text{accelleration; or: } F_k = m \cdot a \quad (1)$$

The mass of air, which flows through the propeller circle of FIG. 1 is:

$$m = G \cdot F \cdot V_1 \quad (2)$$

And, since it is required to accellerate the mass of air, when it flows through the propeller circle from the velocity "Vo"=zero to the final velocity "V2", the accelleration of the mass of air, when it flows through the propeller circle is:

$$a = V_2/\text{second} \quad (3)$$

Consequently, the force obtained by Newton's
$$F_k = \rho F V_1 V_2/s \quad (4)$$

And, since it is known from the theorem of Freude, that the velocity through the propeller circle is the mean value of the velocities before and after the propeller circle, namely:

$$V_1 = (V_o + V_2)/2 \quad (5)$$

the force, which is required to keep an airborne craft with vertical propeller axis (axes) in hovering without ascend and descent is:

$$F_k = \rho F V_1 V_2 = \rho F V_1 2 V_1 = \rho F 2 V_1^2 \quad (6)$$

Or, with I=impulse:

$$I = m^2 V_1 = 2\rho F V_1^2 = H = S \quad (7).$$

The kinetical energy in the air-stream behind the propeller is:

$$E_k = m/2(2V_1)^2 = 2\rho F V_1^3 = N \quad (8).$$

Equation (2) can be transformed to V1, to be:

$$V_1 = \sqrt[3]{N/2\rho F} \quad (9)$$

and the "V1" of equation (3) can be used to be inserted into equation (1), whereby the followings are obtained:

$$H = S = 2\rho F[\sqrt[3]{N/2\rho F}\,]^2 \quad (10)$$

or:

$$H = S = 2\rho F \sqrt[3]{N/2\rho f} \sqrt[3]{N/2\rho F}$$

or:

-continued $$H^3 = S^3 = 8\rho^3 F^3 \frac{N}{2\rho F} \frac{N}{2\rho F}$$

or:

$$H^3 = S^3 = \frac{8}{4} \rho F N^2$$

or:

$$H = S = \sqrt[3]{2\rho F N^2} \quad (11)$$

or:

$$N = \sqrt{S^3/2\rho F} . \quad (12)$$

In the above equations the following values may be used:
- $\rho$ = density of air (for example: in kg s²/m⁴)
- N = Power (for example in kgm/s)
- S = H = lift of thrust (for example; in Kg.)
- I = Impuls (for example in Kg.)
- $V_1$ = velocity of the air in the propeller-circle (f.e. in m/s)
- m = mass of air in the flow (for example Kgmass = Kg/9,81)
- F = are of propeller-circle (for example in m².).

As a first step to explain my invention, I introduce "M" which shall define the number of propellers, which will be used in my craft. For comparison with conventional helicopters it should be understood, that equal diameters of propellers are considered. Also the forms, pitches, configurations and like shall be the same, when propellers are compared.

As second step I introduce the efficiency of a transmission and call it "$\eta$". The transmission may also be my hydraulic transmission of a plurality of separated flows of fluid of equal rate of flow in the flows, I now introduce "$\eta$" and "M" into equation (11) whereby equation (11) transforms to:

$$H = S = M \sqrt[3]{2\rho F \left(\frac{\rho N}{M}\right)^2} . \quad (13)$$

This equation (13) now shows already some very interesting surprises, which will be found to be important means of the present invention.
For example:
The equation explains, that the lift is as greater as the number "M" of the propellers is.

And, the equation has the further surprise, that the lift will not be reduced parallel to the losses in the transmission, but only with the third root of the second power of the efficiency-losses.

These features, which my equation explains, are obtained at the given power. Or, in other words, my equation shows, that, when a certain power is available, the lift or ability to carry, of an airborne craft will increase, when the number "M" of the propellers is increased and when done so, the losses which may appear in a transmission which transfers the power to the plurality of propellers will not reduce the lift or carrying capacity in the same ratio as the losses reduce the power in the transmission, but less, namely only with the third root of the second power.

In short, my equation shows, that with increasing the number of propellers, an increase of lifting capacity or of carrying power, can be obtained.

As a next step to explain my invention, I assume, that in equation (13) equal values will be used for a comparison of a conventional helicopter with a plural propeller craft of my invention. Equal values in equation (13) mean, equal power "N", equal values "2"; equal values of density "$\rho$" and equal values of propeller-dimensions, including equal values of cross-sectional areas "F" through the propeller-circles. For a comparison of flight-technology-systems the equal values can simply be left out of equation (13) and I so obtain my comparison equation (14) which shows my comparison-factor "Ftl"; namely:

$$F_{TL} = M \sqrt[3]{\frac{\rho^2}{M^2}} \text{ or: } F_{TL} = \sqrt[3]{M\eta^2} . \quad (14)$$

With this equation it is possible to calculate a comparison diagram, wherefrom the comparison factor "Ftl" can immediately be seen and which shows, how many times lift a machine with a certain number of propellers and a certain transmission efficiency will give, compared to other or conventional craft. This diagram will be shown in FIG. 17.

The common helicopter has the Ftl value 1 minus the mechanic transmission losses and minus the power which is required to drive the trail rotor. In short, the common helicopter may have a Ftl value of 0.75 to 0.85.

Herebefore the thrusts, lift-forces, thrust-forces and power for the obtainment of certain forces have been calculated for the condition, that the propeller(s) does (do) not move in the direction of the axis(axes). In other words, the equations above are valid for propeller(s) in stand, but not for propeller(s) in movement in the direction of the axes of the propellers.

At the later to be discussed range of flight the craft moves substantially forward in lewelled hight speed flight, where the resistance of the craft in air at the respective speed is in balance with the traction of the propeller(s). I call this range the "flight-range". Contrary thereto, the range where the propeller does not move, where the propeller is at stand or where the craft is hovering, in short, where the above discussed equations apply, we have an other range, which I call the "stand-range" or the "howering-range".

But, according to my "Handbook of my Flight-Technology" there is another range, a range between the stand-range and the flight-range. This range therebetween is called the "inter-thrust-range" in my handbook.

At this Inter-Thrust-Range the craft may permanently change its speed, for example, accelerate. The Inter-Thrust-Range can thereby also be assumed to be an acceleration-range.

At the said "Inter-Thrust-Range" the thrust of the propeller(s) is gradually decreasing when the velocity of the craft increases. The details at this situation and condition are exactly defined by my following equations for thrust or a propeller or of propellers in the inter-thrust-range:

$$S_i = 2N_{IN} \times \eta_G / \left( V_0 + \sqrt{V_0^2 + [\sqrt[3]{16\rho MFN^2} / \rho MF]} \right) = Kg_i \quad (15)$$

or:

$$S_i = 2N_{IN} \times \eta_G / (V_0 + \sqrt{V_0 + 2S_{ibm}/\rho MF}) = Kg. \quad (16)$$

The development of the above equations for the Inter-Thrust-Range can be seen in my "Handbook of my Flight-Technology". The first equation of the two equations, namely equation (15) is the more simple equation in actual calculation. The latter equation (16) is the more accurate equation, but it is more difficult and more time consuming in actual calculation procedure.

A the later "Flight-range" when the craft is flying substantially horizontally in levelled flight parallel to the surface of the earth, and, when the resistance of the aircraft during move in air is in balance with the traction force(s) of its propeller(s); or, in other words, when thrusts of the propellers equals resistance of the craft, but thrusts and resistance are opositionally directed, the following equation is valid:

$$W = (\rho/2) C\omega A V_0^2 \quad (17)$$

and further, also the following equation will be applicable:

$$N = W \times V_0 \quad (18).$$

I now insert equation (11) into equation (12) and obtain:

$$N = (\rho/2) C\omega A V_0^2 V_0 \quad (19);$$

which I transform to:

$$V_0 = \sqrt[3]{2N_{OUT}/\rho C_W A} \quad (20)$$

whereby I have a possibility to immediately calculate the expected velocity of an airborne craft or aircraft in its flight-range.

In the above flight-range equations, the following values may be used:
W = Resistance of craft in Kg.
$\rho$ = Density of air, for example: 0.125 Kg S$^2$/m$^4$ close to oceanlevel;
A = Projection of wings (airfoil) in m$^2$
Cw = Coefficient of resistance; dimensionless;
N = Power in Kgm/sec;
Vo = Velocity of craft realative to air in m/sec..

Equation (14) can also be written in the following form:

$$V_0 = \sqrt[3]{\frac{1}{A}} \times \sqrt[3]{2N_{OUT}/\rho C_W} \quad (21)$$

The latter equation shows directly the influence of wing-area vertical projection and also the influence of power and of the permanent values for the range of flight. For further defining the influence of power and the influence of the permanent values, the equation (21) may also be written as:

$$V_0 = \sqrt[3]{\frac{1}{A}} \times \sqrt[3]{2N_{OUT}} \times \sqrt[3]{\frac{1}{\rho C_W}} \quad (22)$$

and thereby all important influences for the speed which can be obtained in the flight range are directly visible.

With the above equations all conditions for vertical take off, for vertical landing, for the accellerations at the Inter-thrust-range and for actual horizontal levelled flight can be pre-determined and be exactly calculated in advance. The substantial correctness of the equations has been prooven in actual testing in the inventor's laboratory.

With these equations diagrams can be developed which show in detail and in advance which kind of craft are the most economical for take off and for flight.

From said equations and diagramms it can be found, that even, when hydrostatic transmissions of my hydraulic systems are arranged between a power plant, like an engine or a gas-turbine and a plurality of propellers, a substantially higher lifting capacity can be obtained then would be obtainable at the same power installation from a single propeller, if flanged onto the crank-shaft of the power plant. This is at least true for the vertical start or take off, for the subtantially vertical landing and for flight with moderate forward speed. Only at a high forward speed will the single propeller per engine be of higher economy.

Consequentely, it is more economical, according to this invention, to use a power plant to drive or create a plurality of separated fluid flows of substantially proportionate or equal rate of flow and drive thereby a plurality of propellers over fluid motors which are arranged at suitable locations on the craft. These theories are further condition to the fact, that at comparisons equal total power is installed and that the compared propellers have equal dimensions like equal diameters, sizes and pitches. The comparison can not be valid, if in the common craft other dimensions of propellers or power would be used compared to those of the invention.

Therefore, according to the invention, an airborne craft is driven by a plurality of propellers which are driven by hydraulic fluid motors, wherein the fluid motors are driven by separated fluid flows of equal rate of flow which are created in multi-flow pumps or hydrofluid conveying engines and wherein the pump(s) are driven or prime moved by a respective power plant or engine(s).

Accordingly, the invention provides substantially two kind of major airborne craft, namely:
a vertically lifting and landing multo-propeller-craft; and
a horizontally starting and landing multi-propeller-craft; wherein at both cases the ability to varify the location or direction of the propellers influence the ability, attitudes and actions of the craft positively and may help to safe fuel and economisize flying.

In the first case, the first preferred embodiment of the invention, the plurality of propellers are utilized, to be set separately on wings and thereby to obtain a higher sum of lift by the plurality of the propellers at a given power installation and thereby to obtain an economic vertical take off and landing at a small space.

The propellers are thereby preferredly fastened on shafts of hydraulic motors. The hydraulic motors are preferred to be fastened on fluid-pipe structures, which are pivotably borne in respective bearing means in the body of the craft. Thereby it is possible to pivot or tilt the plurality of propellers in unison between a vertical take off and landing position and a position for subtantially forward levelled flight.

According to the invention it is also possible to fasten wings on the mentioned fluid-pipe structure. This safes weight, because the wings do not need any more to have their own bones for the provision of strength and stability. Further, when the fluid-pipe structure pivotes the fluid motors and the propellers, the wings, which are fastened on and borne by the fluid pipe structure are pivoting with it in unison.

A specific feature of this arrangement is, that the wings can be very small, because they do not need to carry the craft up into the air from a runway. The big size wings, which aircraft of common style need, to be able to lift up from the runway at a moderate speed are spared by this present invention, because the craft of the invention can lift off vertically, gradually pivot or tilt its wings to levelled flight condition and thereby obtain forward speed in the Inter-Thrust-range until finally the craft will have obtained a forward velocity high enough to continue to fly on on small wings.

While I have pointed out heretofore, that the equations show, that the craft of the invention is more economic at vertical lift or descent and at moderate speed, it will now be understood, that the aircraft of the invention can also be more economical in operation at high speed, because it needs smaller wings than the common aircraft. The feature of the smaller wing or of the size "A" of equation (15) will now directly demonstrate, that due to the smaller wing, the craft of the invention may even in levelled flight obtain a higher velocity at the same installation of power and thereby become even more economic in substantially horizontal forward flight.

Consequentely, since my aircraft take vertically off, because the big size wings are replaced by the vertically acting take-off propellers, the craft of the invention can at moderate speed also fly with less gasoline consumption than the common aircraft.

This embodiment of the invention spares fuel at the vertical take off and landing compared to the conventional helicopter; and it can, if economically used even spare fuel at flight. It is further easily to be build, inexpensive and safe in operation and its components are reliable. A further specific feature is, that in the following horizontal flight this embodiment of the invention will consume less fuel than a helicopter of equal carrying capacity would. A helicopter uses at horizontal flight about 50 to 70 percent of the howering or take off fuel. But the craft of this invention may use in horizontal flight with moderate speed only one fourth or less than at take off or landing or at hovering in air. At a moderate velocity of 100 to 150 Km/h speed the craft of the invention may use even less fuel than a common car would use at equal speed. A higher or a considerably higher fuel-consumption is required only at higher speed of 150 to 700 Km/h. This increase in fuel consumption is natural and also apparent from equation (21), which shows, that the velocity increases with the third power of the used power or fuel. In short, a doubling of speed requires an eight times increase of fuel if no other factors reduce this ratio.

Further detailed mathematics, technologies and economic details as well as complete outlays and designs beside of other embodiments of the Flight-Technology of the inventor, which also includes hundreds of fotographs and calculation tables and formulas can be studied in "Handbook of my Flight-Technology" by Karl Eickmann, which can be obtained commercially from:

Rotary Engine Kenkyusho 2420 Isshiki, Hayama-machi; Kanagawa-ken, JAPAN.

The said Handbook also includes samples of engines and of pumps and motors. The weights of radial piston pumps and motors have been reduced about to one hundredth of equal power at the fifties.

The Handbook is a compact short-cut on 600 pages of the 50 million words etc. in test records, scientific literature and other literatures of the inventor, as far as flying or the development of little weight, but powerful and economic components like structures, hydraulic pumps, motors, engines or engine-hydraulic power plants are concerned.

When the mentioned Handbook is sold out, or for those who cannot afford its expense, the shorter book "Mini introduction to a new technology" is recommended.

As will be seen from the description of the preferred embodiment, one major object of the invention is, to set a pipe structure with pipes into at least two directions of planes which are vertically relatively to each other, to set ribs between the pipes to strengthen their bearing capacity, to set holding means onto the pipe structure for fastening of the skin of the wings and to apply a plurality of functions and actions to the so obtained pipe structure of the wings. Namely, to lead the fluid to and from the propeller driving motors, to hold the propeller driving motors with the propellers thereon and in addition to form the bone-structure of the wings and to pivot the respective wing portoons. The combination of these plural functions in a single and simple means of a structure obtains the aim of the invention of an economically taking off, stanting and landing aircraft which flies forwards on wings. The heavy weight of the craft of the former art are thereby spared and the aircraft itself has been strengthened and made very reliable and strong.

In an additional object of the invention, the propeller axes are set in a suitable and preferred angle to the zero plane of the body of the craft in order to simplify and ease the transition stage of flight with angularly pivoted wing portions between vertical flight and horizontal flight.

BRIEF DESCRIPTION OF THE DRAWINGS:

FIG. 4 shows a simplified horizontal sectional view through an example of a vertically taking off and landing, but horizontally flying aircraft of the invention, whereat hatching lines are spared in order to make the figure not to small and not too overloaded with lines;

FIG. 5 is a cross-sectional view through FIG. 4 along V—V;

FIG. 6 shows a longitudinal sectional view through a flow-combination valve set whereby a multiple of flows from different power sources are combined to a single continuing combined flow;

FIG. 7 shows a schematic of a sceleton for driving four double-motors of a craft of the invention;

FIG. 12 demonstrates a rotary disc with retractable propellers with the top portion of the figure showing it in a view from the side and with the bottom portion of the figure showing in in a view from above.

FIG. 14 is a sectional view through a wing, taken along line XIV—XIV of FIG. 15.

FIG. 15 is a sectional view through a wing, wherein the sectional hatching lines are spared, because the space is too small.

FIG. 16 is a sectional view through an arrangement of a retractable propeller, which is now my U.S. Pat. No. 4,136,845.

FIG. 22 shows a portion of an aircraft seen from the side.

FIG. 23 shows the craft of FIG. 22 in a horizontal sectional view.

FIG. 24 shows an alternative structure in a sectional view.

FIG. 31 shows another combination of the structures of the invention.

FIG. 32 is a sectional view through FIG. 31 along line A—A of FIG. 31.

FIG. 33 is a sectional view through FIG. 31 along line B—B of FIG. 31.

FIG. 34 shows a structure seen from above.

FIG. 35 is a view onto FIG. 34 seen from arrowed line G—G of FIG. 34.

FIG. 36 is a sectional view along line H—H through FIG. 34.

In FIG. 1 the air-stream through a propeller circle is shown, as known from the conventional air-stream theory. In one portion of the figure for a vertical axis of the propeller for a vertical air-stream at hovering of the craft. In the other portion of the figure for a propeller with horizontal axis and horizontal air-stream through the propeller circle as in forward light. In the one portion of the figure the forward velocity "Vo" of the craft and thereby of the propeller is "zero" namely in the right portion of the figure. But in the left portion of the figure the forward velocity "Vo" of the craft and thereby of the propeller is "Vo".

Figure 1:
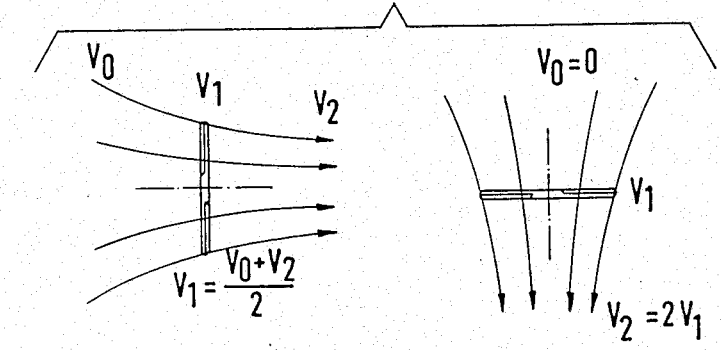
FIG. 1 shows the air-stream through a propeller-circle as it is known from the conventional air-stream theory; namely in one schematic at vertical hovering in the air and in the other diagram at forward flight with the velocity Vo as forward-speed of the craft.

Consequently, as known from the literature, the velocity through the propeller-circle is in the right part of the figure="V1" which corresponds to "V2/2" when "V2" is the velocity of the air after the propeller. And in the left part of FIG. 1 the velocity of the air through the propeller circle is also "V1" but this "V1" corresponds now to: "$V1=(Vo+V2)/2$". Since these facts are generally known from the air-stream literatures, the FIG. 1 contains nothing new. It is however contained in this application in order to explain, that these facts are the bases of the mathematics and of the formulas. For example, the right part of FIG. 1 is the basis for equations (1) to (8) while the left part of FIG. 1 is specifically the basis for equations (9) and (10). Equations (7) to (10) are not known from the leterature. These and other equaitaions can be found in their development again in the "Handbook of my Flight-Technology". Therein many explanations and details are found.

Figure 2:
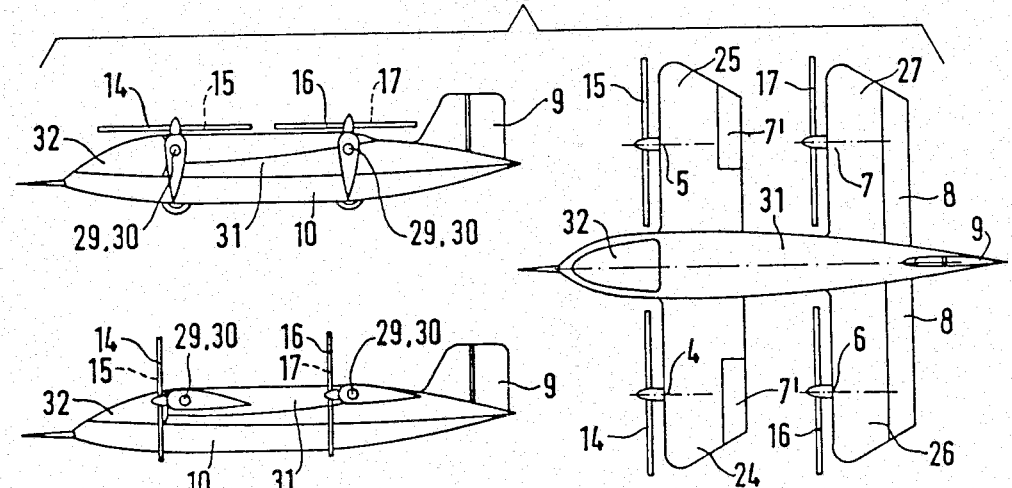
FIG. 2 shows an example of a vertical take off aircraft of the invention in a scale of approximately 1:100 for one to three persons, wherein the craft is once shown with vertically set wings and propellers and in the other part the craft is shown with horizontally directed wings and propellers for flight and wherein the craft is also shown in the other part of the figure in horizontal flight, seen from above.

FIG. 2 demonstrates a preferred embodiment of a vertically taking off and landing craft of the invention, which can horizontally fly on wings. In the upper part of the figure the craft is shown in vertical flight condition. In the bottom portion of the figure the craft is shown in horizontal flight situation and in the right part of the figure the craft is shown in horizontal flight, but seen from above. In this part the craft may be in forward flight.

In body 31 of the craft the power station 10 is provided and preferred to be located in the medial or in the bottom portion of the craft. It may also be a plurality of single power plants, disposed along the bottom portion of the body. Together with other weights, for example tanks, fuel, oil, pumps, acessory devices and like they are supposed to form a gravity centre in the lower portion of the craft to stabilize the location of the craft in the air by a Forces play with an upwards acting lifting centre formed by the upwards tracting propellers of the craft.

On the body 31 of the craft are also the pivot-bearing holders 29 and 30 provided. In them the fluid pipe structure is pivotably borne. The fluid pipe structure is however not visible in FIG. 2. In bearings 29, 30 the fluid pipe structure which forms the borne-structure for holding the fluid motors and thereby the propellers and also the wings can be pivoted, for example, from a vertical position to a horizontal position but in preferred embodiments it may also be pivotable into a braking position for braking the speed of flight when suddenly another object nears towards the craft. The wings 24 to 27 are fastened or may be fastened on the fluid pipe structure. The craft can also fly without wings. But then the propellers are kept in an inclined position relatively to the surface of the ground. Therefore it is said, that the wings may be fastened to the fluid pipe structure. But the fastening or application of the wings is not for every craft of the invention a must. The craft may have a side rudder 9 and ailerons 77. Some of the wings may be provided with elevators 8 as shown in FIG. 4 or some of the wings may act as elevators 8.

In the following I will define what actions an airborne craft may do. This will be in accordance with the "Handbook of my Flight-Technology" as follows:

Vertical rest or flight is "hovering".

Forward movement is "flight"; and; movement with inclined propeller axes is "move".

Conseqently in the left upper part of the FIG. 2 the craft is shown in "hovering"; at the left bottom portion the craft is shown in "flight" and in the right part of the FIG. 2 the craft is also demonstrated in "flight". The craft is not demonstrated in "move", but a "move" of a craft is demonstrated in FIGS. 10 and 11.

At "hovering" the propellers form together a lifting-centre. This is located above the earlier mentioned gravity-centre. The forces-play between lift centre and gravity centre keeps the craft in stable position at hovering, while vertical ascent and descent are vertical flight and at such vertical flight the said centres also continue by their forces-play to maintain the stable location of the craft relative to the surrounding air. The bottom of the craft thereby remains at all times of hovering and at vertical flight like ascent and descent substantially parallel to the ground and the craft remains upright at all those actions or hovering at rest.

By the fluid line structure or bone-structure of the craft the fluid motors 4 to 7 are borne. The fluid motors may be hydraulic motors in this and the other figures. It could however also be gas or air-motors. These fluid motors are driven by fluid streams. They are driven with equal rotary velocities while motors of diametric locations relatively to the body form motor-pairs of counter directional rotation. Similarily the propellers form propeller-pairs. For example Propellers 14 and 15 form one propeller-pair while propellers 16 and 17 form a second propeller-pair. Naturally, each propeller of the same propeller pair revolves in the opposite direction relative to the other propeller of the same propeller-pair, but both propellers of the same propeller-pair have the same or equal rotary velocity which means, equal revolutions per time, for example, an equal number of revolutions per minute.

An example of the inner structure of the craft of FIG. 2 is given in FIG. 4.

Figure 3:
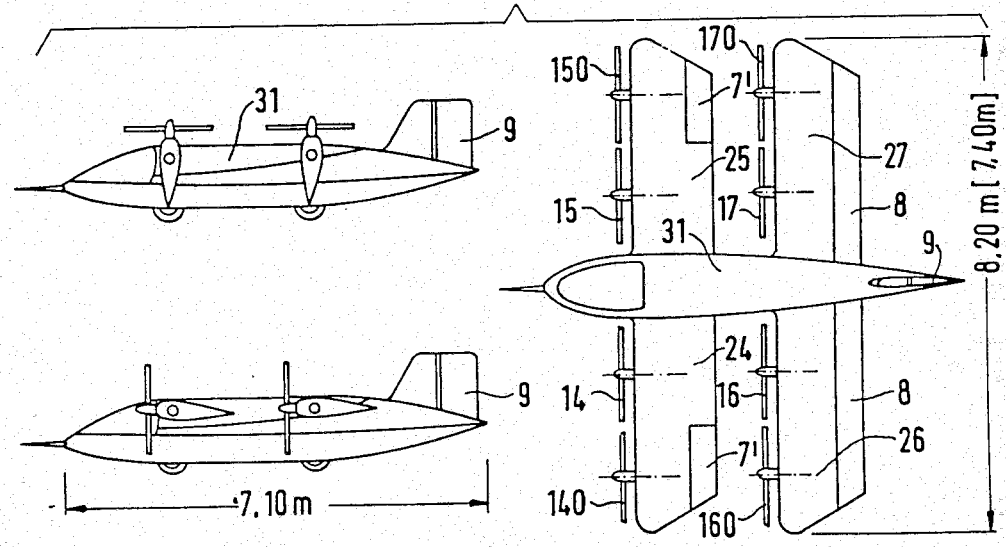
FIG. 3 shows another example, similar to that of FIG. 2, however with eight propellers, while the craft of FIG. 2 has only four propellers.

Also, the design, capability, size, cost and like are functions of time and of the technology of the respective time and of availabilities of the respective time for FIG. 2 as well as for other craft of the invention, especially depending of the technology of the respective power plants and to the respective fluid handling devices of the respective time, the FIGS. 2 and 3 are shown in a scale of about 1:100 in order to give a first idea in which size the craft of the invention can be build. Thus, the figures show first examples of small-size craft which can be materialized with the presently available technology, when the power plants, hydraulic devices and fluid-line structures of the inventor are used. They can not in all cases be realized, when wrong power plants, hydraulic devices or wrongly designed fluid line structures are used. At present time the craft of the invention require the highest standard of technology which is in this specific field presently available only from the inventor's laboartory or from his licensed manufacturing companies.

According to the invention, the craft of the figures cannot only be build in the small size for 1 to 3 persons, but also in larger sizes for many persons or as transport-aircraft. The scale in the figures shall therefore by no means define, that the invention is limited to the small size of the scale of the figures. Greater sizes, larger sizes, higher capable craft are designed and partially build and can be commercially obtained from the inventor or from his licensed firms.

Otherwise the FIGS. 2 and 3 show those craft which at present time can be obtained with smallest expense for 1 to 3 persons or the respective transportation weight. The craft of these figures has enough space in a bigger garage of a car and it can also be build in such bigger garage of a car. The building expenses are less than the costs of nowadays luxury cars. The components for building the craft can be obtained from the inventor. And so can be the drawings together with the "Handbook of my Flight-Technology".

FIG. 3 is also demonstrated in a scale of 1:100. The scale is not in all details absolutely exact. FIG. 3 shows the more elegant and the more desireable solution for the vertically taking off craft compared to FIG. 2. However, FIG. 2 is the more easily build able and less expensive in building presently than the craft of FIG. 3. The craft of FIG. 3 is presently considerably more expensive than the craft of FIG. 2. The craft of FIG. 2 is more easily to be materialized because of the bigger diameters of its four propellers. The propellers of bigger diameter carry more and lift more than the propellers of small diameter at the same sum of installation of power. Consequently, it is more easy to take off with the craft of FIG. 2 because with the bigger diameter propellers of FIG. 2 the craft needs less power for the vertical take off and is therefore lighter in weight, because it needs a smaller number of engines or an engine of less power. The propellers of the sizes for the craft of FIGS. 2 and 3 are nowadays available and can be obtained commercially also from the inventor. The disadvantage of the craft of FIG. 2 is, that the propeller require such big diameters, that the tips of the propellers at horizontal flight are revolving below the bottom of the craft. That can bring difficulties at emergency landings in horizontal flight with horizintal landing on wings, because the tips of the propellers would then meet the ground and the propellers would break. The craft of FIG. 2 therefore requires for emergency landing on wings an arresting means for the arresting of the propellers in a horizontal position. FIG. 3 on contrary thereto has so small propellers, that the tips of the propellers remain in the air also when the craft lands on wings in horizontal flight and sets onto the ground on the wheels. The craft of FIG. 3 has at least 6 or in the FIG. 8 propellers. This is required to obtain enough lift with the propellers of such little diameter.

A common feature of both craft, that of FIGS. 2 and 3 is, that the wheels do not need a retraction into the body. Thus, the craft can operate without retractable wheels and simple wheels, which are extending only a little from the body downward are enough for horizontal landing on wings. For vertical landing and take off no wheels at all are required. However, since the craft has the ability to take off and land, either vertically or horizontally, the little cost and weight of simple non-retractable wheels adds much value to the craft, because it makes the horizontal starting and landing easily possible in addition to the vertical take off and landing. To add retractable wheels or undercarriages is however possible, if so desired.

At non-windy weather the crafts of FIGS. 2 and 3 can take off and land from and into a place of about 10 meter by 10 meter. At windy weather however to land into such a small space, a certain skill of the pilot is required. Another common feature of the crafts of FIGS. 2 and 3 is, that they can fly with high speed as aircraft can do, that the propellers do not need the elastic helicopter blades or not the varyation of pitch during a revolution as the helicopter needs and in addition, that the craft can land at any country place in bad weather, when the bad weather reaches the flying craft remote from an airport. Still another common feature of both craft is, that they can convert to vertical flight, howering or to rest in air or even to brake in the air and to reverse the direction of flight, when another obstacle comes into the flight path of the craft. Accidents are thereby prevented and should not occur without pilot error.

Also the following design details are no matter of the patent claims, they are described here in order to give an idea what sizes are today available in such craft. The propellers of FIG. 3 are, for example, HOCO Propellers of Hoffmann propelleworks Germany, namely types HO-V-62 of 1, 6 to 2, 4 meter diameter. The power plants are two or three four cycle or two cycle engines of Rotary Engine Kenkyusho and the propeller fluid motors and the pumps are also motors and pumps commercially availably from the said Rotary Engine Research institute at 2420 Isshiki, Hayama-machi, Kanagawa-ken, Japan. The pumps and motors are preferedly corresponding to the inventor's U.S, Pat. Nos. 3,850,201; 4,037,523; 3,977,302 and other patents of the inventor. The power plants may be those of FIG. 8 and supply a take off power of 100 to 180 HP, each, according to type. Their weights are less than 100 Kg each. Spare parts for the power plants are available from stocks in all smaller cities around the world. The power plants are operating economically as four cycle engines do.

For higher speed and for more than 2 persons, the craft of FIGS. 2 and 3 may have one or more gas-turbines of the roughly 300 HP range.

For the 1 to 2 person version with four cycle power plants, the following datas, also they may change with time, will roughly apply today:

| Velocity = speed of the craft | fuel consumption per 100 Km flight | range without landing |
| --- | --- | --- |
| 280 Km/h | 29,2 ltr | 421 Km. |
| 260 Km/h | 23 ltr | 520 Km |
| 220 Km/h | 18 ltr | 670 Km |
| 150 Km/h | below 10 ltr | 1100 Km. |

The above values are a first information only and are subject to change without notice.

The prices of the crafts of FIGS. 2 and 3 without gas turbines are supposed to be 90,000,-to 140,000,-German Marks or foreign currency equivalent. The present prices of prototypes are understandingly higher. For those who desire to get the respective craft for less money, the parts thereof can be obtained from the research institute of the inventor for home-building of the craft. Thus, the utilization of the craft for actual flying is presently possible for example under the rules of USA as experimental aircraft.

Since the vertical take off and landing crafts of FIGS. 2 and 3 can at bad weather land everywhere, even in the country side and the pilot and passengers can stay over the bad weather or over the night at the available hotels, motels, inns and resthouses, an expensive navigation- instrumentation can be spared, if so desired. The most important feature of such vertically flyable aircraft is anyhow, that a bad weather must not lead to an accident, just because there is not airport available for a quick landing. When an instrumentation is desired and the expenses for it are not feared, then it is recommendable to use a radar device of inventor's U.S. Pat. No. 3,801,046 for the automatic prevention of collusions with other craft or obstacles in the air.

In FIGS. 4 to 7 some examples of preferred details of the vertically and horizontally flighable craft are illustrated. However, sectional views through the hydraulik engine, hydraulic pumps and motors are not given in this application, because those are described in detail in about 400 patents of the inventor in many countries, about a hundred patents in the United States alone, and they are given in details in the mentioned "Handbook of my Flight-Technology" or in my respective "Handbooks on Hydraulics and Engines". The mentioned Handbooks also contain details of performances, test data, testing methods, sizes, powers, efficiencies-mechanic and volumetric, connection means, assembly rules and like, so, that FIG. 4 and the other respective figures in this application can be restricted to schematic illustration.

In FIG. 4, the power plant, for example engine 11, drives a four-flow pump means or fluid flow creation means for the supply of four separated flows of proportionate or equal rates of flow in the separated flows, shown by numeral 1. Accordingly the power plants 12 and 13 drive respective four flow pump means 2 and 3. In each case, the power of the respective power plant is devided substantially into plural equal power portions in the said pumps. From each of the fluid-flow-creation means for multiple separated flows of equal rate of flow - in the following shortnamed "pump" or "pumps" four from each other separated and not with each other communicating fluid lines are extended to the respective fluid motors 4 to 7. Each one fluid line from the respective power plant's pump to a respective one of the motors 4 to 7. These fluid lines are not numbered in the figure, but demonstrated in the figure by lines whereon arrows are drawn to show the direction of flow of fluid in the respective fluid line. There are also return fluid lines provided in the craft, but those fluid lines for return fluid are not shown in FIG. 4. But, instead thereof arrows are marking the return flow from the respective return fluid lines of the fluid pipe structure. The other details of the return fluid lines and numbers of fluid lines are spared in FIG. 4, in order to prevent an overloading and difficulty of reading of FIG. 4. Details of fluid lines are shown by way of example in FIG. 7, so that such details are not required in FIG. 4. The arrows on the respective lines show clearly how the flows are flowing from the respective pumps to the respective motors and that is what counts in this figure.

It should however also be recognized that flows from different power-plant pumps which lead to the same fluid motor, may be combined to a combined flow. To do so, it is recommended to use one-way check-valves in the fluid lines to prevent return flow from one fluid line into the other. How that is done in detail is shown by way of example, in FIG. 6.

FIG. 6 demonstrates by way of example such combination of a plurality of flows from different power sources to a single fluid motor. Fluid lines 235,335,435 may come from different pumps of different power plants 1,11 and 2,12 and 3,13. One way check-valves 159 may be provided in said fluid lines. Each one in a respective one of the fluid lines. The valves 159 may be streamlined and may be guided in guide means 169. After the valves 159—see the arrows to understand the meaning of "after", —the fluid lines combine to a single combined fluid line 135. This fluid line 135 goes therefrom to one of the motors 4,5,6 or 7. The pressure in the fluid line 135 presses the valves 15 to close towards the respective fluid line 235,335 or 435. When fluid flows in the fluid lines 235, 335 or 435, the respective valve 15 is opened to let the flow flow from line 235 or 335 or 435 into the common combined fluid line 135.

But flow in the opposite direction, or back-flow, or flow contary to the direction of the arrows is prevented by the automatic closing of the respective valves 159.

When there are three power plants, each with a four-flow pump in the craft and when four propeller motors shall be driven by four such combined flows, there will be four such valve-sets as in FIG. 6. Thereby each of four combined fluid lines 135 will receive about one fourth of the power of each of the three power plants. The number of flows and of pumps and engines is by way of example. Any other desired number may be materialized in such one-way check valve sets as in FIG. 6. Thus, each motor 4,5,6 and 7 will receive one combined flow 135 and thereby each of said motors will receive one fourth of the fluid supplied by the pumps and one fourth of the powers of each of the engines or power plants. The combination of several specific fluid lines from different engine-pump sets will not disturb the equalness of the rates of flow in the separated combined fluid lines 135, because the separated fluid lines 135 are not combined with each other. Care must however be taken, to connect the proper fluid lines. If wrong fluid lines are combined, the desired effect can not be obtained.

While such combinations, as described in FIG. 6 may be done, it is not in all cases required to use them. That will be apparent from FIGS. 4 and 5. Because, the to be described fluid-pipe structure requires at least three fluid lines or at least two fluid lines plus a third stabilizing bar or pipe for the purpose of obtaining a self-bearing rigid fluid pipe structure capable of bearing and holding the respective motor(s) propeller(s) and/or wing-portion(s).

Figure 9:
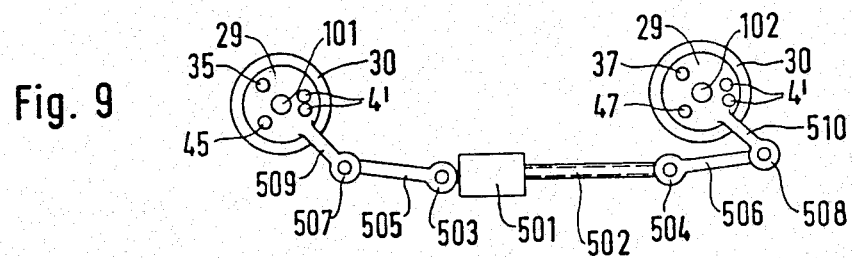
FIG. 9 shows a sample of an embodiment of a tilting or pivot-arragement of the invention for the pivoting or tilting of the fluid pipe structure of the invention.

Returning now to FIG. 4, it will be seen, that the body 31 of the craft has bearings 29, which are pivotably borne in bearing sleeves 30. The bearing-bodies 29 are borne in bearing sleeves or bearing houses 30 and are able to pivot or to swing therein. The pressure fluid delivery lines 34 to 37 and/or 44 to 47 and the return fluid lines 49 are extended through the bearing bodies 29 and fastened therein. As seen in the figure, there are four bearing housings 30 and four bearing bodies 29 are pivotably borne therein. A cross-sectional view is seen in FIG. 9. The upper left bearing set 29–30 carries fluid delivery lines 35 and 45 and one or two return lines 49. The upper right bearing set 29–30 carries fluid delivery lines 37 and 47 and one or two return lines 49. The lower left bearing set 29–30 carries fluid delivery lines 34,44 and one or two return fluid lines 49. The lower right bearing set 29–30 carries fluid delivery lines 36 and 46 and one or two return fluid lines 49.

The fluid lines, which extend through the bearing sets as described are preferred to be fluid pipes. For example steel pipes or light-metal pipes. If steel pipes are used, they may have walls of 1.2 to 2.5 mm thickness. Steel-pipes have the feature to be easily weldable. At the innermost ends of the fluid pipes the pipes are open towards the interior of the body 31 of the craft, but they are at these ends provided with connection means for the pivotable connection to other fluid pipe portions or they have connection means for the connection of flexible pressure hoses. On the other ends, which constitute the outer ends, the respective fluid lines are fastened to a respective entrance- or exit-port of the respective fluid-motor 4,5,6 or 7. Instead of fastening them directly to the said motors, also here additional connection means or flexible hoses might be interposed. However, it is preferred not to do so, but fasten the other, the outer, ends of the fluid pipes directly to the said fluid motors 4,5,6 or 7. On the inner ends however flexible connections to the fluid lines from the pumps are a must in order to maintain the seal of the separated fluid lines, when the bearing bodies 29 swing or pivot in the bearing housings or sleeves 30.

An important specificty of the invention is, that the fluid pipes, which were here described are utilized to form or to form together with additional means, the fluid-pipe structure for rigidly bearing the motors, propellers and -or wing portions at vertical and at horizontal flight and also in the Inter-Thrust range, when the fluid pipe structure is swung or pivoted in the bearing sets 29–30. For this purpose the combining connecter portions 125 are provided to connect a respective right side structure with the leftside structure of the craft. The simplified term "structure" is used here and sometimes in the later part of the specification to indicate, that the said "fluid-pipe-structure" is considered by this single word. The connecters 125 are preferred to have rounded ends, which are connected to the ends of the respective fluid pipes of the left and right structure. It is preferred to weld the ends of the connectors 125 at a certain short distance before the inner ends of the fluid pipes to the fluid pipes. Rib-plates may be added. The feature of such arrangement is, that the fluid lines 34 to 37 and 44 to 47 as well as the return pipes 49 can then consist either of straight pipes or of pipes with only one bow and two straight ends. Such fluid pipes have the feature, that the interior of them can be cleaned easily from the straight ends. Such cleaning is important for every operation of a hydraulic or fluid circuit. For example, the welding of the connectors 125 to the structures will result in disturbation of the cleanliness of the inner face of the respective pipe and so will the welding of holding members for fastening of the fluid motors or of the wing-portions. Consequentely, after such welding and before the final assembly or filling of the fluid lines, the fluid pipes should be cleaned inside. For that purpose the straight ends of the pipes and the application of the connectors 125 with bows on their ends, are convenient and and important. Fasteners 66 are either connected to the pipes or welded onto the respective fluid pipes 34 to 37 and 44 to 47. They have the purpose of easily fastening wing portions 24 to 27 or each one thereof thereon. The fasteners 66 may also serve to form and hold the airfoil-configuration of the respective wing portions 24 to 27.

FIG. 5 shows, how the fluid pipes are located by way of example and where the holders or fasteners 66 may be located relatively on the respective fluid pipes. Holders 14, which may be rivetts or bolts or other means, are set through the fasteners 66 to held the respective portions of the wing portions 24 to 27. The wing 125,225 may then consists of two or several parts, which are hold by means 14 on fasteners 66, or the wing portions may even consist of a single form-piece of a cross-section as shown in FIG. 6. Such one piece wing portion could then from the ends be just moved over the fluid pipe structure and then fastened by bolts or like 14 on the fasteners 66. Between the separated fluid pipes of the structure, ribs 5 may be set or welded.

Thus, the fluid pipes 34,44,35 and 45 together with the internal connectors 125 and the ribs 59 between the pipes and connectors are forming one rigig fluid-pipe-structure which carries two fluid motors 4 and 5 and two propellers 14 and 15 and which may in addition carry the wing portions 24 and 25. This single structure is pivotably borne in the left and right front bearing sets 29-30 of the craft.

The fluid pipes 36,46,37 and 47 together with the respective internal connecters 125 and the ribs 5 between the fluid pipes and the connecters form an other rigid fluid-pipe-structure which carries two fluid motors 6 and 7 and two propellers 16 and 17 and which may in addition carry the two wing portions 26 and 37. This other single structure is pivotably borne in the rear left and right bearing set 29-30 of the body 31 of the craft. How the described fluid-line structures are pivoted in the mentioned bearing sets 29-30 is by way of example described in detail in FIG. 9.

The described fluid-line structures are an important part of the invention. Mechanically operated vertically and horizontally flying craft with four propeller and two wing sets have already been proposed, for example in U.S. Pat. No. 3,181,810 to N. C. Olson and in U.S. Pat No. 3,184,181 to D. H. Kaplan. Those mechanically operated craft however are very heavy because they need bone-structures for the wings to carry the wings and they need mechanical transmission means with many gears for furns and angles and holders for the transmission means from the engines to the propellers. The transmission shafts must be able to transfer the high torques. These number of parts required summarized a too heavy weight. It is therefore very doubtful if such mechanically operated convertible aircraft can ever obtain an efficient operation or even an operation at all.

They are not seen in flight presently. And, if they would fly, they would require strong power plants of extremely little weight, for example like gas-turbines. That makes them expensive in purchasing costs and expensive in flight because of a high fuel consumption. In those patents of the former art of mechanically operated convertible aircraft there has also never been a satisfactory mathematical analysis of the features or troubles and drawbacks of single- or multiple-propeller arrangements.

On contrary to those devices of the former art, the present invention brings a very detailed and very accurate mathematical analysis of the powers and lifting capacities involved. The mathematics of the invention teach the higher carry- and lift-capacity of the multiple propellers at a given power supply.

The benefit of higher lifting and carrying capacity by the multiple propellers would however been lost again, when the mechanism to carry and drive the multiple propeller sets would be heavier than the benefit of carrying capacity obtained thereby. It is here, where the weight of the fluid-pipe-structures and of the fluid motors, the fluid pumps, the engines and the quantity of hydraulic fluid to be carried are an important part of the invention.

For example; the four propeller craft of FIG. 2 will carry at 80 percent hydraulic efficiency about two times of what a conventional helicopter of equal power and equal propeller diameter would carry on gross weight. The 8 propeller craft of FIG. 3 would even have a still better carrying capacity of propellers if equal sizes would be used for equal total power installation.

From the gross lifting capacity however, the weights of the wings, fluid-line-structures, fluid motors and propellers are to be subtracted. The weights of them are therefore of high interest. They are presently in the prototype of FIG. 2 as follows : Weight of each fluid motor is 8.6 Kg. Weight of each variable propeller is 11 Kg. Weight of each double fluid-line structure for a left and right fluid motor and propeller is 14.5 Kg each. The pipes in said prototype are of 16 mm outside diameter and of 1.5 mm thickness of the walls. Thus, the weight of the sum of the fluid motors, propellers and fluidline structures in FIG. 2 is less than 120 Kilogramm. That is a little weight, compared to the benefit of lifting capacity obtained by the arrangement. In comparison only the difference between said 120 Kg and the weight of the rotors and tail-structure of the common helicopter is the amount of weight by which the craft of the invention is heavyer than a conventional helicopter.

Quite naturally, at design and building of fluid line structures the laws of strength and rigidity must be obeyed. When the designs of the inventor are used, there is no risk of break or unreliability and there is no risk of deformation. Also, it is important to use proper fluid motors. They are available from inventors patents and designs with single or double rotors, with releasable couplings, with automatic free-wheeling and with propeller-pitch adjustment devices, according to the situation of actual application. The user is however be cautioned, that at present time there are no other fluid motors than those of the inventor available which fulfill these conditions. The world is governed by conventional achsial piston motors, which are very good for ground applications and also for the drive of assessories in aircraft, but which are not of the required nature and capacity for driving and holding propellers as such in the invention.

The fluid-drive separated flows of equal rate of flow system of the invention in combination with the little weight but strong fluid-pipe-structure of the invention are therefore an important means to reduce the weight of convertible aircraft and to increase their reliability and economy. In fact, the craft of the invention may be the first and until now sole convertible craft which can actually fly and do so with simple four cycle combustion engines.

On the wing portions 24 and 25 the ailerons 77 may be provided. The body 31 has mostly a side-rudder 9 and the rear wing portions 26 and 27 may be adjustable in its angle of attack in order to act as elevators in horizontal flight. As an alter-native the wing portions 26 and 27 may also be pivoted in unison with the front wing portions and the rear wing portions 26 and 27 may then be provided with elevators 8. The rudder, ailerons and elevators may be operated mechanically, hydraulically, pneumatically or also electrically depending on the actual requirement and design. These details are not written in the figure, because they do not bring principially new systems. The known systems are just differently set in the aircraft of FIG. 4. New are however the FLUID-PIPE-STRUCTURES, the bearings of them, the extension of them through the bearing sets and other details thereof.

FIG. 5 which shows a sectional view along V-V of FIG. 4 demonstrates also, that the return fluid lines 4 may be set closely together in order to form a resistant triangular structure by the fluid lines for example 34,44 and 49,49. The return fluid lines 49 can also be combined to be a single fluid line. The triangular location on the corners of the triangle of the fluid-lines are part of the provision of rigidity and of strength of the fluid-pipe-structure. Together with the ribs 59 between the fluid pipes the fluid-pipe-structure is rigid enough to carry the fluid motors, propellers and wing portions without major deformation and without undesired vibrations. The fluid motors run smooth and without vibration anyhow and plural propellers of less diameter than a single big helicopter rotor run anyhow with much less vibration and unequal loads during a revolution than a big helicopter rotor does. Instead of using one-body or two body wings it is also possible to use wing-airfoil structure ribs and set thin covers over them. Instead of triangular location of the fluid lines rectangular placement, or placement of multiple forms like multiples are possible, if so required or desired.

In FIG. 5 a symmetric profile is demonstrated for the respective wing-portion. It is however also possible to use unsymmetric airfoils as in common aircraft. If those are applied, the airfoils should not be set absolutely vertically at take off or landing because they would supply a backwards directed movement. They would have to be tilted slightly forward for an actually vertical take off or landing. That will be described at hand of the later discussed FIG. 10.

Attention is further directed to the fact, that the wings in the FIGS. 2 and 3 are so dimensioned, that the propeller-streams flow over the major portion of the wings. Thereby the propeller-air-streams are providing an effect onto the wings so, as if the wing would fly through air. That provides lift, when the airfoil section is used or when the propellers are inclined relatively to the wing. The so obtained lift-action of the wings must be taken in consideration. It prevents to a great extend the possibility of stall of the aircraft; it prevents the break down of the undisturbed airflow over the wings and it allows high angles of attack relatively to the ground at time of Inter-Thrust-Range "move" of the craft. That is a feature, which was seldom or even never to such extend obtained in any craft of the past.

There exists even the posibility to lift the aircraft in horizontal location just by flow of the propeller-streams over the wings. That however is a specifity which again is discussed in "Handbook of my Fligh-Technology". The dotted lines in the fluid motors of FIG. 4 demonstrate, that these motors may either be single rotor motors or double rotor motors, for example of my U.S. Pat. No. 3,977,302. When those double-rotor-motors of said patent are used, the number of fluid lines are as in FIG. 4 or they may even be doubled for application in FIG. 3.

FIG. 9 shows a schematic cross-sectional view along the line IX—IX of FIG. 4 and demonstrates a sample of a pivoting device to pivot the front structure and the rear structure in unison. It may also be used in the craft of FIG. 3 or in others. In the bearing-bodies 29 are the therethrough extending fluid lines—fluid pipes—35,45 or 37,47 etc. and also the return lines 49 provided and fastened. Control-fluid lines 101 and 102 may also extend through the bearing bodies 29 to be led from there to places to control propeller-pitches, propeller and fluid-motor retractions, ailerons or elevators. Instead of control fluid lines mechanic, electric or other control means may also extend through the bearing bodies 29. The control means 101 may also extend to other controllers or rudders which are not mentioned here.

In body 31 of the craft the drive-motor 501 is provided and in the example of FIG. 9 the self-locking spindle 502 is extended through motor 501. Motor 501 drives the spindle 502 forward or backward to the left or right in the figure. Motor 501 is remote controlled from the cockpit by the pilot, when the craft is flown by a pilot or otherwise it may be remote controlled from the ground. The control of the motor 501 is the control of the pivot-action of the wings, motors and propellers and thereby a major piloting action. It controls the varyation from vertical flight through the Inter-Thrust-Range to horizontal flight and vice versa. The speed of vertical flight like landing and taking off may be controlled by the engine acellerator, the adjustment of rate of flow of variable pumps or by the propeller-pitch.

A selflocking spindle and motor 501 and 502 is here preferred in order that probable vibrations will not move the spindle when not desired. The self-locking effect also serves to maintain the angle of pivoting or the angle of attack relatively to the ground at times when no pivotal movement is desired. The bearing bodies 29 have in the figure arms 509 on the front bearing body and 510 on the rear bearing body 29. Intermediate arms 505 and 506 are placed between the arms 509 and 510 and the spindle 502 and connected to them in swingable connections 507, 503, 504 and 508. Thereby the for- or back-movement of the spindle 502 actuated by motor 501 pivotes the bearing portions 29 of the front structure and of the rear structure in unison. The rearward location of spindle 502 is for the horizontal flight and the leftmost location of spindle 502 is for the vertical flight, brake or backward flight of the craft. The locations between those locations of extremes define the angle of attack or the pivot angle of the propellers, motors and wings relatively to the ground and thereby the move in the Inter-Thrust-Range. The extension of the move of the spindle 502 into an extreme frontward position is suitable to obtain an effective braking effect or backflight in the air at times when an obstacle nears the flight path of the craft. A fast-speed motor 501 is suitable and often desired for fast action of vonversion from horizontal to vertical flight and vice versa. In common transport aircraft the pivotal action may be suitable when it is slow, but in aircraft for sports and for acrobatics as well as for police or military craft the high speed motor 501 may be more desired.

The arrangement to control the pivotal action or said action in unison as shown in FIG. 9 is an example only. Any other reliable and suitable control mechanism may be applied if so desired.

It may also be mentioned, that one should not assume, that when the air-space would be overfilled with aircraft of this invention, that that would result in many accidents. Accidents are actually not required. Accidents are an appearance of high-speed aircraft, which lack the ability to rest in the air and which lack the ability to land at places which are no airports. The craft of the invention can fly in series or lines as cars are doing on the road and the already mentioned automatic radar control devices can automatically prevent collusions in the air. The devices of my U.S. Pat. No. 3,801,046 can also automatically force craft of the invention to fly behind each other with any given slow or high speed. It can also brake them automatically down to low speed, rest or back-movement. These means are as accurately possible as in cars on the road but even more better because of the automatic control by U.S. Pat. No. 3,801,046 which is not yet routine on cars on highways. In fact, the further possibility to pass another craft on a higher or lower flight level adds further safety and the fact that a craft in air has less resistance than a car on the road would even save fuel, when an equal number of equal fast aircraft would fly in the air instead of cars running on the road. Those possibilities have been highly desired, but they were never obtained because the proposals of the past lacked the manoverability of the convertible craft and they failed to become airborne because of their too heavy weight or they were too uneconomic because of the need of high power gas-turbines which can not be afforded by the average budget of average citizen.

In FIG. 7 one of those schematic plans is demonstrated, which the inventor prefers in the craft of FIGS. 2 to 4. Two power plants would be anough for the vertical take off and landing, but in this schematic three power plants 1, 2, 3 are provided. The third of them is there for the remote possibility, that one of the power plants would fail just during a vertical take off or landing. In horizontal flight a single power plant would be enough to be kept air-borne. In the figure the return fluid lines are not shown in order to keep the figure free from an overload of lines and in order to keep it by simplicity in a form for easier understanding.

One reason for the use of three engine-hydraulic power plants or two of them also is, that they are available in a suitable power range of 80 to 180 HP each in the inventor's research institute. Of these sizes two engines would be anough to operate a vertical start or landing; one engine set would be anough to remain airborne and the third set will be available at an engine failure at vertical flight. In practice all two sets or there sets are running together but with lower rates of power when lower power is required or satisfactory.

An automatic power control may be provided for overriding the pilot's control or for overriding by the control of the pilot, depending on the rate of perfectness and extent of installation of the craft. Overriding automatic controls can therefore be spared, when not desired or when they are too expensive for the user of the craft. An overriding automatic control may for example hold three power plants at ⅔ or ¾ of maximum power during operation, but when one of the engines fails automatically and immediately bring the two other power plants to full gas or power. The pilot may then feel, that his craft now ascends a little slower and thereby feel, that one of the engines has failed. He may continue his ascend to override an obstacle, like a tree, a house or like or may continue his flight, when he desires only a short distance flight, or he may start his landing manouver for repair or replacement of the third engine. Details thereof are again obtainable from "Handbook of my Flight-Technology".

At bigger size craft of the invention, for example in long-distance craft or intercontinental craft of the principles of FIGS. 2,3,4,13 etc., the failure of one engine is no reason to stop the flight. At such bigger or longer distance craft such a number of power plants is applied, that the failure of one or two engines still allows the continuance of the flight. At Intercontinental or long distance craft the engines can even be repaired in flight or replaced in flight, because the engines and pumps are located in the body of the craft and they can be reached for repair by the mechanic. Engine-hydraulic power plants as in the invention can be shut off from the fluid lines and the other sets of hydroengines can then continue o drive the craft. After repair of an hydraulicengine set it can be connected to the respective fluid lines again. The case of engine failure of an intercontinental craft of the invention over the ocean will even, when there are no means for repair, not prevent the aircraft from reaching its destination. It may just force the aircraft of the invention to continue the flight with slower speed and thereby to save fuel—see equation (16)—which then would just result therein, that, when an engine failed over Paris, the New York bound craft would just—because of the engine failure—become able to fly not only to New York, but even to Chicago, just because it was forced to safe fuel because it had one engine less in operation. The only discomfort would be, that the flight would last a longer time.

The possibility of continuing travel even at engine failure and the possibility of repair of engines or transmissions at travel are nowadays not yet common even not in road traffic.

The four from each other separated pressure fluid flows of equal rate of flow which are produced in four separated working chamber groups with four separated outlets in the pumps 1,2,3—which may for example be pumps of inventor's USA patents as mentioned earlier—extend as flows 61,71,81 and 91 from pump means 1 of power plant 11 to the upper rotors 4,5,6 and 7 of the four double rotor motors of for example my U.S. Pat. No. 3,977,302 and help to drive them.

Similar four fluid flows extend from pump means 3 of power plant 13 as flows 63, 73, 83 and 93 to the lower rotors 54, 55, 56 and 57 of the said fluid motors and help to drive them.

When—which should not happen—foreign particles, like dust or shavings enter one of the rotors and block the rotation of one of the rotors, the power plant will be stopped because of overloading. The other rotors will then continue to drive the shafts to the propellers. The communicated set of rotors in the motors, whereof one is blocked, are then overrun by the revolving shafts by one-way or free wheeling means, thereof. Thus, even a blocking of a rotor of a propeller motor will not prevent the craft from flying.

The similar flows 62,72,82 and 92 are extending from the pump means 2 of power plant 12 over one way check valves as in FIG. 6 or over similar one way flow means to fluid lines of the other pump and engine sets. So, for example, fluid flow 62 enters over the valve into fluid line 61 and/or 81;
fluid flow 72 enters over the valve into fluid line 71 and/or 91;
fluid flow 82 enters over the valve into fluid line 63 and/or 83; and
fluid flow 92 enters over the valve into fluid line 73 and/or 93.

In case of blocking of one of the motor rotors the full power of the drive-set 2,12 will then flow in the rate of ¼ of the full power of set 2,12 into the other rotors of the four fluid motors and drive them accordingly in addition to the flow from the other still oparating drive set 1,11 or 3,13. In case, all rotors are healthy each of the rotors of the four motors will then obtain one eighth of the power of the drive-set 2,12.

It would also be possible to apply four, five or more drive sets, so, that the specific communication of the drive set 2,12 can be spared. Instead of double rotor-motors it is also possible to apply single rotor propeller motors. At small craft as shown in FIGS. 2 and 3 it is however desired to limit the number of power plant sets in order to keep the total weight low for a smooth vertical take off and landing of the craft.

In this connection it should also be mentioned, that the world today is led by achsial piston pumps and motors. While those are suitable for ground application, it is not necessary, that they are also suitable for main propeller drives of vertically taking off aircraft, where the life of the pilot and of the passengers depends on the reliability of the pumps and motors. Under the decades long application of achsial pistons motors the impression has arisen worldwide that only achsial piston pumps and motors are reliable and useful. Radial piston devices and radial chamber devices have for the medial and high pressure ranges almost disappeared from the markets during the fifties and sixties.

This historical development is however not entirely directional for application in aircraft. Because the axial piston devices have connections between the pistons and the shoes or the drive flanges for the conrods to the pistons and of them to the pistons. Thus, when in such axial piston device a dust partical of too big size and of too strong material would enter the clearance between the piston and the cylinder, the drive mechanism of the piston or for the piston would break. Axial piston motors are further single rotor motors. If in such motor such fatal break would happen, such motor-break would be fatal in a multi-propeller air craft at least at vertical flight, like vertical take off or landing. This shows, that the reliability on ground and the almost force-governing of the hydraulic market by achsial piston devices can not give any absoulte guarantee for safety in an aircraft of ability for vertical flight. It is rather highly riscful to use such axial piston pumps and motors in vertically taking off and landing aircraft, because of the fatalness of sticking of a piston in a cylinder.

In the radial piston pumps and motors, which I apply in vertical take off and landing aircraft, there are no connections between pistons, shoes and drive means, like piston stroke actuators or guides. The U.S. Pat. Nos. 4,037,523 and 3,949,648 of the inventor clearly show, that the pistons, piston shoes and actuator or guide members are completely unconnected. The pistons and shoes float freely in a bordered space. When one of the pistons of them would stick in the cylinder because of an equally disastrous dust particle, that would not lead to a stopping or braking of the pump or motor. The sticked piston would just rest in the innermost location in the respective cylinder and the other pistons of the same rotor would continue to work. A respective pump or motor would just lose a seventh or nineth of power and its running and torque would become at little ununiform, but the sticking of the piston would not be fatel.

It may again be noted, that two power plants and pump sets would also be satisfactory, if correctly designed and build. In such case however, an engine failure during vertical flight might lead to a certain descend of the aircraft when no other emergency devices like auto-rotation of the propellers or the like would take an immediate action. Many fluid motors of the inventor include such automatic autorotation of the propellers in vertical flight like landing or taking off. It may be mentioned also, that in many countries the use of a single power plant is allowed by law to drive and operate a helicopter. Thus, even a single power plant may be operated in the craft of the invention, when a certified aircraft engine or like is used. The pump means may then be a four-flow, six-flow, eight-flow device, according to the actual situation. Instead of setting two wing-portion pairs onto the body of the craft it may also be possible to set one wing portion pair or three, four or more wing-portion pairs and propeller-pairs. The multiple arrangement is especially suitable when the aircraft shall serve as a weight carrying transporter.

The mentioning of an intercontinental aircraft of the invention shows, that there are presently not many limits as to the increase of the size of the aircraft. For the individual or for the family however a simple and inexpensive craft is the first desire. The sizes of the aircraft of the invention can even be reduced to smaller scales and be minimized in size. That however requires an increase of power of the power plants. The smaller the size as higher is the fuel consumption for a given carrying capacity. As larger the size of the aircraft is for a given carrying capacity as lower will mostly be the fuel consumption. That shows, that the economy of operation may increase with the outer dimension of the craft. The bigger sizes are otherwise tending however to more float in the air and beeing of slow motion and delicate to turbulence in the surrounding air, while the smaller dimensioned craft are less delicate at turbulent air, faster maneuverable and speedier, but as the technological consequence also more expensive in operation and more fuel consuming. In small dimensioned craft, the fourcycle engine may not be strong anough and small shaft-gasturbines may be required. They are adapted to drive the multi-separated flow pumps of the inventor. Such gas-turbines are extremely powerful at a very little weight. For example 300 or more horsepower at a weight of around 65 Kilograms. Details thereof are again visible in "Handbook of my Flight-Technology". However, such gas turbines have a certain fuel consumption. Applicant therefore attempted to utilize four cycle engines. It is not required to use common aircraft engines. The common aircraft engines have until now not proven to be specifically suitable for the aircraft of the invention. They are too heavy, because they are designed to revolve with such revolutions which are suitable to flange the propeller onto the crankshaft of the engine. They also fail to have flanges, whereonto the pump sets could be fastened. In addition many of them fail to have the cooling fans for aircooling of the engine at vertical flight when there is no cooling airflow over the engine. Consequentely straneous affords have been necessary over three decades to develop suitable hydrofluid conveying engines. They are now available in aircooled and also in watercooled versions, they are of little weight relatively, and they are also reliable in operation.

The weight-lift balance of the craft of FIG. 2 is presently, when 2,4 meter diameter propellers of Hoffmann composite light weight types are applied, as follows:

| Weights: | | |
|---|---|---|
| | Fluid motors 8 kg each (4 pieces) = | 32 Kg. |
| | Propellers = 6 Kg each (4 pieces) = | 24 Kg. |
| | Fluidpipe structure without bearings = | 18 Kg. |
| | Fluid pipe structure bearings = | 10 Kg. |
| | Wing skins (four sets) = | 52 Kg. |
| | Light weight body = | 58 kg. |
| | one EHP power plant including pumps = | 99 Kg. |
| | two 150 HP gasturbine EHP sets incl. pumps = | 102 Kg. |
| | Pivoting control arrangement = | 10 Kg. |
| | Flexible fluid hoses etc. = | 10 Kg. |
| | Total; excluded personal and fuel and tanks: = | 415 Kg. |
| Lifting capability: | Installed power = 410 HP max. | |
| | Available to the propellers = 308 HP. | |
| | Lift = ft = 12,3 × fn = 47 × fp = 1,8 = Lift max. = | 1040 KG., | which gives enough reservation for the pilot and fuel. when one of the main engines fails at start or landing proceedures with vertical wings and propellers, the power reduces maximally to 260 HP, giving into the propellers = 195 HP, whereby fp reduces to 34. Thereby the maximum of lifting capacity reduces to 1040×34/47=752 Kg. To prevent the remote possibility of engine failure at vertical flight with difficulty of continuing to fly and to prevent accidents, that craft should not be loaded higher than to a total weight of 750 Kilogramms. Thereby the craft obtains the ability to continue its move or hovering in the air, even, when one of the main engines fails during the critical period of vertical start or landing. The gasturbine EHP's fivefold the price.

The weight—lift capacity balance of the example for the 2,4 meter propeller craft shows, how relatively low the weight of the structure of the invention is. The fluid motors are specifically designed to fit directly to the structure of the pipes of the invention. They can be fastened each by 14 M-8 inside hexagon bolts, also called cap screws. The propellers in this ample are non-variable pitch propellers. These have the feature, that they are extremely reliable. They are made practible in the invention by using variable DAV pumps of my products, patents or applications. At vertical lift the propellers require high torque to become revolved. The pumps then run with smaller piston strokes for delivery of a lower quantity of highest pressure fluid. At later horizontal flight the propeller pitches which are non-variable are however then working at small angles of attack because of the higher speed flight through the air. Thereby they are requiring less torque and can therefore revolve with higher rotary velocity to still beat in the air.

Figure 8:
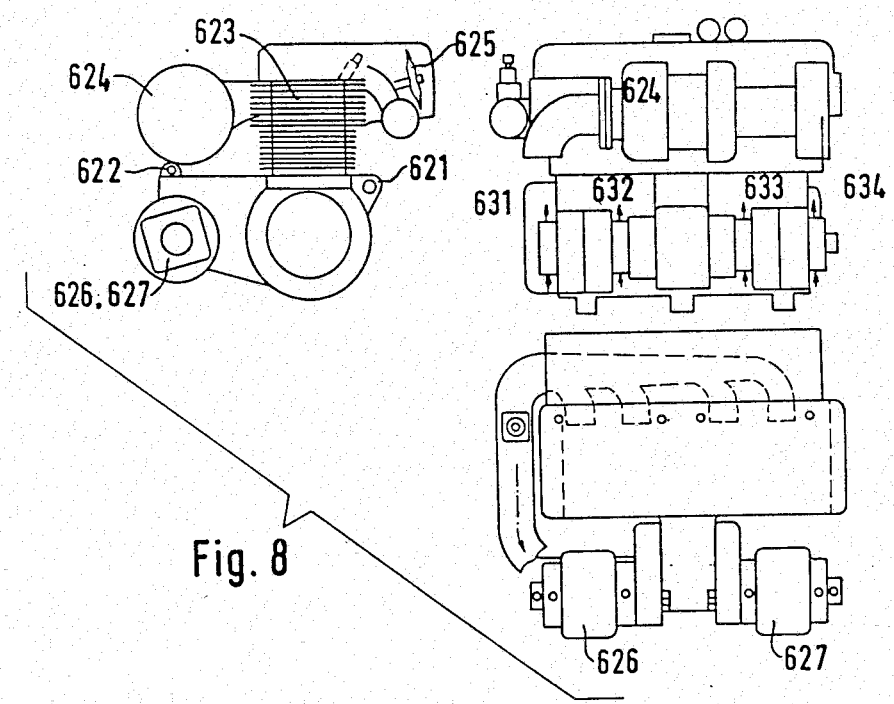
FIG. 8 shows an embodiment of a sample of the engine hydraulic power plant, which can be used in the invention and which is now commercially available from the laboratory of the inventor.

At the forward flights speed of medial forward velocity of the craft, the two gasturbine EHP sets can be shutt off and the aircraft can then fly solely on the more fuel-saving EHP power plant of FIG. 8.

In this explained sample, the aircraft is an extremely safe craft. Because the constant pitch propellers are reliable and do not break. No variable pitch arm fittings are there and they cannot break. At engine failure at only limited hight above the ground, the common helicopter may not have enough time to change to autorotation and may then crash. But the craft of the above example will not crash at an engine failure, because the remaining two engine hydraulic power plants will be enough to continue to carry the craft at hovering, flight or even slight ascent to overcome an obstacle in the flight path. This is a feature, seldom obtained by a helicopter or any other VTOL craft. These features are obtained by the structure of the pipes of the invention in combination with the holding of the motors, wings and driving of the propellers by the fluid through them. Because the savings obtained in weight by the invention are enough to employ the third power plant, the gasturbine-pump EHP set of 51 Kg of weight and 150 HP max, which are the spare engine for the safety at vertical take off and landing. Obviously no former art concept has made a craft with enough reduction of weight to make the carrying of a safety providing plus-power engine possible in a VTOL aircraft which carries at vertical lift or descent the wings in addition to the propeller rotors. In each discussed EHP set the pumps are incorporated to the engine set and made to fit to the pipe structure of the invention. The fluid motors are made to fit also to the pipe structure of the invention and they are made to hold and drive the propeller as well as including the bearings for the holding of the propeller shaft, which in this case is the motor shaft. The thrust taking bearings are also in the fluid motors. All holdings, bearings and like of the former art have thereby been spared. Weight of the craft is reduced.

The sample of a hydraulic-engine power plant of FIG. 8 may be utilized as one of several possibilities to serve as drive set 1,11,2,12,3,13 of FIGS. 2 and 3 or 4 or as drive sets in other figures of this application. It consists of a combustion engine portion 623, a cooling means 625 which is commonly an air-cooling but may sometimes also be a water-cooling, a fastening means 621,622, a turbo-charger 624 and double-flow or multi-flow hydraulic pumps 626 and 627 with delivery ports 631 to 634 for the delivery of four separated flows of fluid of equal rate of flow. One of the features of the sample of FIG. 8 is, that the power may be taken of from the crankshaft in the middle between a plurality of cylinders. Sofar that is generally known and exercised and has the feature, that the crankshaft can be of little weight. A specific feature of the invention however is, that two double-flow pumps can be mounted head to head into a single drive-wheel. The drive wheel may be driven from the crakshaft-middle by gears or a chain (or chains). The thrust forces or traction forces exercised onto the drive wheel by the chain or gear can at this arrangement be counter-acted by the forces of fluid in the cylinders of the pumps onto the rotors of the pumps. By this arrangement the resultant of load on the drive-wheel between the pumps can be reduced relatively to other arrangements or the wheel can even float between those opposing forces, whereby friction in the bearings of the drive wheel can be reduced.

In a practically applied sample of such powerplants, build by the inventor, the engine portion including the tubocharger weighs about 75 Kg including electric starter motor and can make about 100 to 120 HP depending on charge-pressure and fuel. A two-cycle engine according to an U.S. patent application of the inventor it can make 150 to 180 HP at reduced weight of only about 70 Kg. The pump sets used in this power plant set are standard products of the inventor, can be obtained from the inventor and weigh according to respective type about 5,6 to 9,0 Kg. Each pump takes about one half of the power of the engine and delievers about a fourth of the power of the engine to each of the separated four flows. The power is however reduced by the efficiency losses in the pumps. These are however small.

The power plant for the delivery of separated flows of hydraulic fluid of FIG. 8 is, however, only one sample of the drive sets which are now avaible through the research instituted of the inventor. For long-time or long-distance travel, watercooled engine sets with or without turbochargers are occasionally applied for the long distance flight, while gasturbines or engine sets as that of FIG. 8 are added and operated only at the short times of vertical flight.

Figure 10:
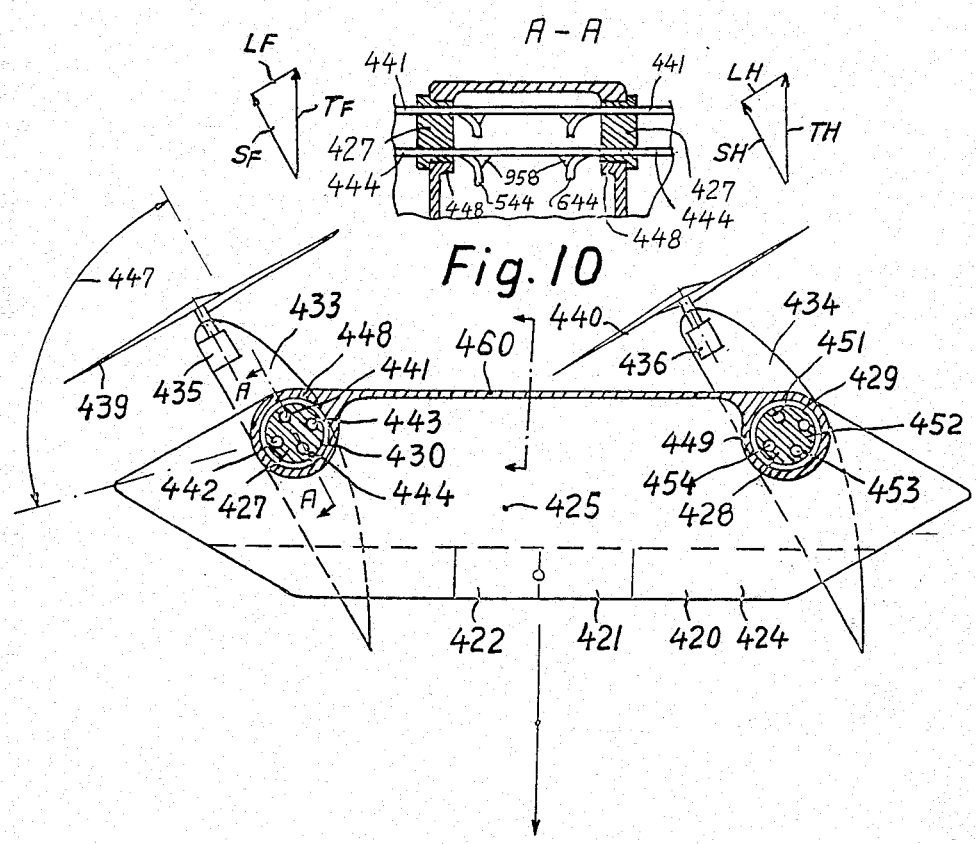
FIG. 10 is a longitudinal sectional view through another embodiment of the invention.
Figure 11:
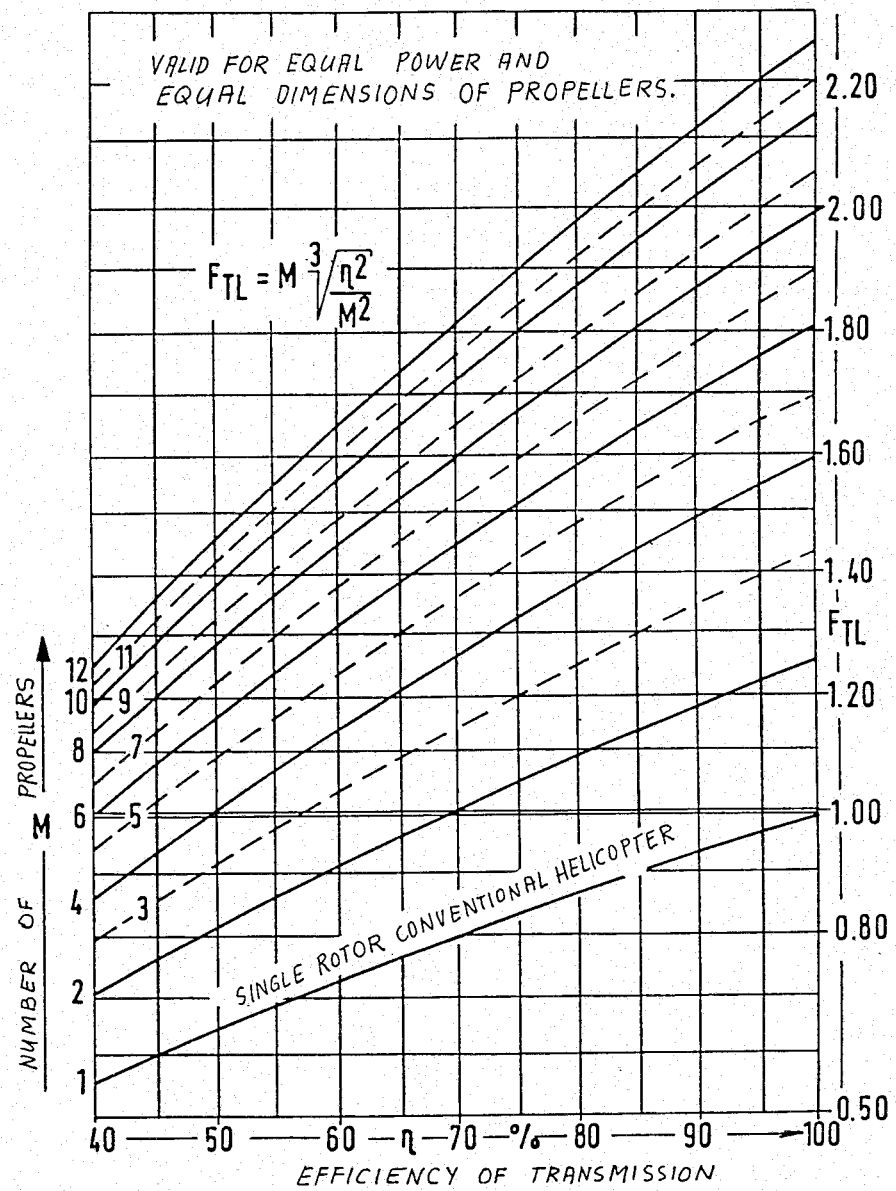
FIG. 11 is a schematic diagram which shows accurately the comparison factor "$F_{TL}$" of the invention.

In FIG. 10 a double winged aircraft is shown, having a body 420 with a heavy weight compartment 424 and a freight or passenger cabin 425. The heavy weight compartment preferably contains the power plants, engines, pumps, 421 and 422 and other heavy material to form the weight centre in the middle, but low in the body 420 of the aircraft. The body 420 is also provided with two or more wing bearings 448 and 449 wherein the main bonestructures 430,429 of the wings 433, 433 can be pivoted with said wings at an angular intervall 447. The main bar or main bone of the wings may contain fluid lines 442,443,444,441, 451,452,453,454 to fluid motors 435,436 for driving the said motors and thereby the propellers 439,440 which are associated to said fluid motors. Said fluid lines communicate respective chamber groups of respective pump means with respective fluid motors.

The propellers 439,440 force air with high velocity over the wings 433,434. The profile of said wings then provides a wing-lift L which is named LF for the front wing and LH for the rear wing. The direction of said wing lifts LF and LH is however not upwards, but upwards to the rear as shown in the component arrow diagram of the figure when the wings have the angular pivot-position as shown in the figure. At same time the propellers 435,440 provide a traction S in the direction of the axis of propeller and fluid motor. Front traction is cited by SF and rear traction of propeller is cited by SH. The component of forces diagram hows, that these forces SF plus LF summarize to the upward directed front force TF and at the rear of the craft the forces SH and LH summarize to the upward force TH. Both forces TF and TH are upwards directed, parallel to each other and equally distanced from the centre of the craft. The weight W is downward directed from centre 455. Forces TF plus TH and contary directed force W keep the aircraft in straight position. Increasing the sum TF plus TH over W brings vertical upwards move of the aircraft. Equalizing gives hovering and decreasing of the sum TF+TH below W gives vertical sinking of the aircraft of the figure.

For forward flight both wings 433 and 434 are downwardly forwardly inclined within the range of angle intervall 447 depending on the desired flight path of the craft relative to the horizon.

It might be of interest, that the setting of the best angle of the wings relatively to the body and ground will increase the overal lifting capacity in vertical direction. In the craft of FIG. 2 for example, when it has 2,4 meter diameter propellers and 2,4 meter wing portions of 2 squaremeter projection area, the best angle between SF and TF or SH and TH is about 12,5 degrees which is an inclination relatively to the body and the ground of about 77,5 degrees. The overall vertical lift is then 2,4 percent higher, than the verical lift of the propellers without wings would be at vertical axes of the propellers.

The lift-weight balance becomes less favorable, when no gasturbines are applied and only the fourcycle power plants of FIG. 8 are used. The better lift-weight balance is thereby more expensive.

A further feature of the invention is, that practically unbreakable propellers can be utilized at certain embodiments. For example propellers, which have a constant pitch, but which are made of a single piece of material. For example of wood, compound, plastic, metal. Integral arms are then extending oppositely from the medial portion or flange portion. The fluid motors include the bearings to bear the rotor, whereby the rotor of the motor acts as propellershaft and every propeller bearings of the former art are spared and not necessary. A good angle of attack for such fixed pitch one piece propellers is between 8 and 20 degrees at ¾ of arms. It should be understood however, that such propellers are not suitable for the known mechanically driven VTOL craft with pivotable wings. Because to make the application of fixed pitch propellers, which do not break and which are of little weight only and which are inexpensive and reduce the weight and cost of the craft of the invention, it is necessary to apply a high torque to the propellers at vertical lift with slower propeller revolutions and to apply a higher rotary velocity with lesser torque to the propellers in the forward flight. Because in the forward flight the "Cw" value of the propeller goes down, because of the then smaller relative angle of attack to the air. But at hovering for example, the relative angle of attack in the air and to the air is higher, which gives a higher "Cw" value and therefore requires a higher torque. This problem is managed at a given power of the power plant(s) according to the invention thereby, that the delivery quantity of the pumps becomes made variable. The pumps 1,2,3, or 626,627 are then variable pumps. They then supply high pressure fluid at a lower rate of flow at vertical propeller axes, but higher rate of flow with medial pressure at the forward flight of the aircraft. The pipes of the structure must be of small diameters and their axes must be distanced from each other by multiples of their diameters in order to obtain the rigid structure, capable of carrying a load in two normal to each other planes.

The embodiments shown in the figures are examples only. When the rules of the invention are obeyed, many modifications, departing from the figures are possible without leaving the scope of the invention. Several embodiments of the application may be applied not only in vertical take off capable aircraft bus also in horizontally flying, starting and landing craft. For example, the retractable propellers and fluid motors of the invention as well as the fluid-pipe-structures of the invention, which carry the wings, whereby the wings carry the craft.

The application shall further serve to give a first impression about the many possibilities which arise by the utilization of the drive and control-system of the invention. For an understanding of all technological details and calculations the study of the "Handbook of my Flight-Technology" is highly recommended, because to designing and building of aircraft more knowledge is required than just the teaching of a patent application. The mentioned handbook is a compact short-cut on 600 pages (about) of the 50 million words and testrecords, which have over 30 years of intensive work led to the less weight, compact and powerfull devices like power plants and hydraulic devices, bone structures and other details of the invention.

Of the many possibilities this short patent application can bring only a few examples and embodiments. The sizes which are shown in the specification bring also only a few of many different sizes and powers. The mentioning of sizes and powers in the application shall therefore not give the impression that the invention is materialized in practical building and testing only for the specific sizes given. The "Handbook of my Flight-Technology" contains on its end the numbers and titles of about 400 patents of the inventor and also the numbers and titles of about an equal number of scientific reports and test-reports, development reports and like.

The factors "fl", "fp", and "fn," which wre used in the lift to weight balanced of the example, are taken from the mentioned book "Mini Introduction to a new technology" and they are the lift factor "fl" defined by the number of the propellers, the propellerfactor "fp" defined by the diameter of the propeller's and the power factor "fn" defined by the HP which are supplied into the respective propeller(s).

Figure 13:
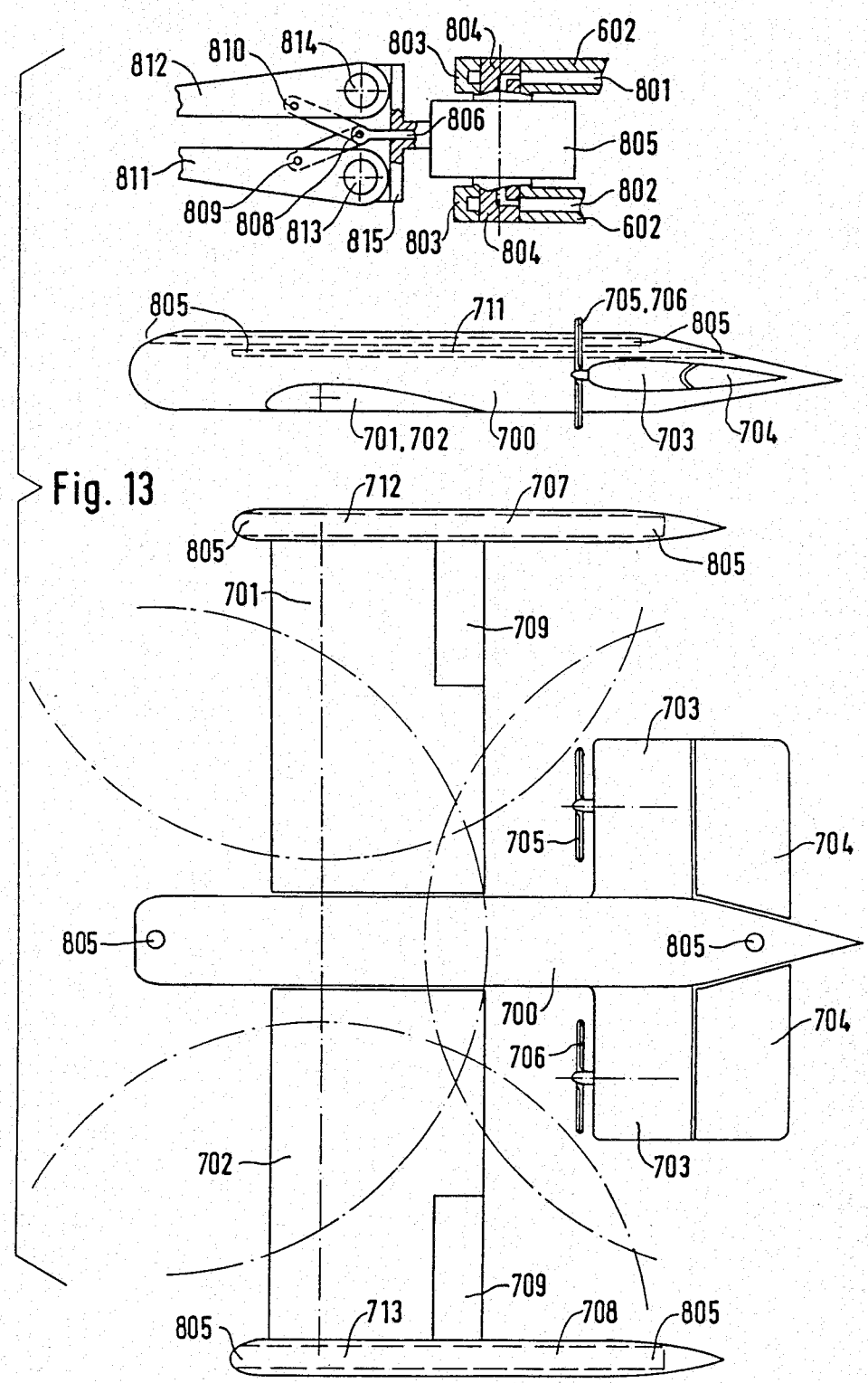
FIG. 13 demonstrates an overseas aircraft for vertical take off and landing with retractable propellers in cigar-shaped containers on the ends of the wing tips.

I am now nearing the discussion of the long-distance or intercontinental vetically taking off craft of FIG. 13.

For the short-range flights of several hundred kilometers or a very few thousand kilometers, the craft of the systems of FIGS. 2 and 3 are very suitable and almost ideal, because the travel time and costs to the airport can be spared. The times at red signals on roads can be spared and the destination can be reached faster and for less money than with nowadays conventional transportation means. For intercontinental flight, however, the propeller diameters of the craft of FIGS. 2 and 3 are too small to be able to carry the needed large amount of fuel vertically up. An intercontinental craft may have an amount of fuel which may be as heavy or even heavier than the other total weight of the intercontinental aircraft. The weight of fuel again depends also on the speed of the craft. The intercontinental craft should however not travel with a too small speed, because the travel times would become troublesome long at such long intercontinantal distances. The weight of the fuel required is therefore a major difficulty for vertical take off craft for intercontinental or long-distance—travel.

As follows from the equations of this application, there are only three possibilities to increase the lifting capability and thereby to increase the ability to lift a large weight of fuel fuer long distance or intercontinental travel; namely:

The two possibilities which existed and can be found by equation (10) are, either to increase the value "F" by increasing the diameter of the propeller and to increase the power "N". Both possibilities are, however limted. Greater "N" requries greater weight and fuel consumption. Propeller diameters can not be build unlimited in size. To these two possibilities I added the third possibiliy, namely to utilize a plurality of propellers driven by fluid streams of proportionate rate of flow. Thus, I introduced also in the equations, the greater number "M" of the propellers.

To utilize the first two possibilities leads not to an easy success for an intercontinental-or long-distance vertical take off plane. The increased of power again increases weight. The added weight again requires more power and more fuel. To utilize vertical take off jets, as some military aircraft do, would mean to use up fuel for hundreds of miles of flight at the few minutes of vertical flight for take off and landing. A possibility however remains the utilization of the multiple propellers "M" of the respective equations of this application in combination with larger propeller-circle areas "F".

Accordingly, in the sample of a long-distance or heavy load craft of FIG. 13 of the invention, a plurality of large size propellers are utilized to carry the craft vertically up or to set it vertically down, but in horizontal flight to retract the larger propellers into the aircraft to reduce the resistance in flight and thereby safe fuel. The piloting of such craft with retractable propellers needs training and experience. The long-distance or heavyload carriers of FIG. 13 are also not now fully build, because their costs exceed the financial resources of the inventor. They are however calculated in detail and designs can be delivered in case of need and payment. FIG. 13 brings at present time the highest possible lifting capacity for heavy weight, long-distance or intercontinental vertical take off and landing craft between the several concepts of this application.

In FIG. 13 the aircraft body 700 has wings 701,702 with ailerons 709 and substantially long-cigar-shaped streamlined hollow bodies 707,708 on the tips of the wings 701 and 702. The body 700 has two openings 805 which are the ports of two respective or of one combined hollow space(s) 805 which are preferredly located in the upper portion of the body 700 of the craft.

The upper part of FIG. 13 shows in principle a foldable propeller with blades 811,812 fastened on holder 815 of the shaft of fluid motor 805. The unit consisting of the fluid motor with the propeller will be cited by referential 805. The openings 805 in the body 700 of the craft are openings to spaces 711 for the reception of each one propeller-motor set 805. The hollow bodies 707,708 on the wingtips also contain spaces 712 and 713 for the reception of each one motor-propeller-unit 805. The said spaces 711 and 712 and 713 are therefore provided to be able to contain folded motor-propeller units 805 of a propeller radius of about the Length of a wing fo the craft or of about the length of about a half of the length of the body 700. Thereby an extremity of large propeller circle areas "F" is obtained combined with the plurality of "M"propellers, namely 4 lifting propellers which brings 1.58 times higher gross lift than a single propeller of equal size would do. At vertical take of the propellersets will be located with fluid motors 805 at the four places shown in FIG. 13, namely on the front tip and rear tip of body 700 and on the tips of the wings. The axes of the propellers will then be directed vertically. When the craft will have obtained enough forward speed to be able to fly on the wings, the propellers 805 may be pairwise become retracted into the respective spaces 711,712,713. The aircraft will thereafter continue to fly as a usual aircraft of my U.S. Pat. No. 3,823,898. The craft will then be carried on the sustantially horizontally directed wings 701 and 702 and be driven by the at least one pair of propellers 705,706 which are arranged symmetrically of the body 700 and which are driven by fluid motors which are driven by a respective number of separated flows of hydraulic fluid of equal rate of flow. The elevators 704 may be provided on the craft and so may be a siderudder, not shown in the figure. The propeller pair(s) 705,706 may be applied on the wings 701,702, on respective arms or on the end-wings 703 of the elevator-portion of the craft.

The craft of FIG. 13 can thus obtain an extremity of high lifting and carrying force for vertical take off and landing as well as obtaining a high speed and economic horizontal flight. When the weight carrying capacity is used to a considerable extend for carrying fuel, the craft will be able for long-distance flights or even for intercontinental flights.

How to subtract the propeller-sets 805 into the spaces 711,712,713 of the craft, is shown in the upper part of FIG. 13, The arms 602 carry the motor 805. Fluid lines 801 and 802 are extended through the arms 602 and therefrom through swingbodies 804 into and out of the fluid motor 805. The arms 602 have ends which form bearing housing portions 803 wherein the bearing body portions 804 of the motor 805 are pivotable or swingably borne. The fluid to and from the motor 805 is led through the fluid lines 801 and 802 respectively. The bearing sets 803-804 provide the possibility to swing the respective motor 805 with the propeller thereon from vertical into horizontal position and vice versa and into any desired angular position therebetween. The shaft of the fluid motor 805 carries a flange 815 with swingbearing holding portions 813 and 814 whereon two (or more) propeller arms 811 and 812 awre swingably borne. A remote controlled achsially moveable member 806 which may be driven by a control flow of fluid may be moved in the shaft or rotor hub of the fluid motor 805 and thereby move another swing bearing 808 forward or backward from or to the motor 805. Swing arms may extend from swing bearing 808 to further swing bearing connections 809 and 810 on the propeller arms 811 and 812. Thus, when the control-member 806 is extended (moved outward) from the shaft of the fluid motor 805, the the propeller arms 811 and 812 are swung into a radial position to act as propellers during their revolving. When the control member 806 however is retracted into the innermost position in the shaft of fluid motor 805, then the propeller arms are swung forward into a each other substantially parallel position as shown in the upper part of FIG. 13. In this "swung in" position the propeller-arms then are substantially within the same radial dimension relatively to the motor axis as the holding arms and the motor are and the whole unit can now be re-tracted into a respective space 711,712,713 of the aircraft. More details of an example of a retractable propeller are shown in FIG. 16. In FIG. 13 are only those means are described, which are not described in detail in FIG. 16. The description of details is kept to a minimum in FIG. 13, because more details will become known from the discussion of FIG. 16.

A very convenient retractable propeller is shown in FIG. 16. This motor-propeller unit can also be used in the craft of FIGS. 2 or 3. Accordingly a space 488 is located in a body 489 in the wing or in another portion of the aircraft. It is especially effective when the space 488 is provided in a wing or wingtail of the craft. Body 489 is configurated to receive in the space 488 therein a fluid motor 482-493 and to let the motor 482-493 move backward and forward in space 488. A drive—mechanism 485 may be associated to the space 488 and be connected to the fluid motor 482-493. The drive mechanism may be a hydraulic piston in a hydraulic cylinder and receive fluid through control fluid lines 483,484 to move the drive piston of it forward or backward in space 488 and thereby motor 482-493 forward or backward in space 488. Motor 482-493 drives and carries a foldable propeller with at least two foldable propeller-arms as those in the upper part of FIG. 13. In FIG. 16 the fluid motor and propeller are demonstrated in the two extreme positions. At inward location the fluid motor is shown by motor 482, at outward location the fluid motor is shown by fluidmotor 493. At the outward or forward location of motor 493 the propeller arms 496 and 497 are radially extended for operation as propellers as seen in FIG. 16. The radial extension of the propeller arms may be done as in FIG. 13, top part, or the propeller arms may even extend themselves—swing themselves—into the radial position by centrifugal force during high speed revolution. In the inner or backward position the fluid motor 482 is retracted into the deepest possible location inside of space 488. The arrangement of FIG. 16 is now my U.S. Pat. No. 4,136,845. The arrangement is not claimed by claims in this specification but shown for a better oversight of the practical possibilities of aircraft building.

The propeller arms 486,487 are now forwardly folded, substantially parallel to each other, in order that they find anough place in the chamber 488 to be subtracted thereinto and to be kept therein. The folding of the propeller blades into the forward position for retraction into chamber 488 may be done by remote control as in the upper part of FIG. 13, but it may also be done automatically. In the latter case, the rotary velocity of the shaft of the propeller motor may define the direction of the propeller arms. For example, a high rpm of the rotor of the fluid motor may swing the propeler arms into the radial-propeller-action position by centrifugal force, while a low rpm or non-revolving may swing the propeller-arms under a spring or like-action into the forwardly swung position. The automatic position control of the propeller arms by the rotary speed of the fluid motor(s) is especially convenient, because it can be easily handled by the pilot. A medial revolution speed of the fluid motor(s) may define a position between the extremes of position and thereby enable an intermediate range of propeller action. If smoothly arranged and controlled the retraction of the propeller and fluid motor as well as their extension may be suitably handled and even be steplessly variable during the conversion process. When the propollers are of relatively small diameter, as those in the craft of FIG. 2 or especially of FIG. 3, the extension-and retraction-action of the fluid motors and propellers of FIG. 13-top and FIG. 16 can be handled smoothly and without excessive disturbance of smoothness of flight or of flight-stability. In FIGS. 16 the fluid lines 465,466, 463 and 464 are the fluid lines to the fluid motor 482,493. Flexible fluid line portions may extend from them to the ports of fluid motor 482,493 in order to facilitate the forward and backward move of the motor with the propeller arms in the space or chamber 488. The fluid pipes 463 to 466 are forming the bone-structure or the fluid line structure of the respective wing portion. The outer cover(s) 481 of the wing which forms the airfoil-shape may be fastened on the fluid-pipe-structure 463 to 466. The motor-propeller-containment-chamber 489 may also be fastened to the fluid-pipe-structure 463 to 466 of the respective wing-portion.

FIG. 12 demonstrates in a schematic figure another possibility of a retractable propeller. The disc- or discus-shaped body 640 is a rotary disc and contains propeller-arm receivable chambers 641 and 642. The propeller chambers 641 and 642 contain and guide at least partially the propeller-arms 643 and 644. The propeller blades 643 and 644 can be moved radially inwardly and outwardly in chambers and guide means 641 and 642. The body 640 is a disc, which is towards the outer portions thereof thinned, whereby it obtains a substantially symmetric streamlined configuration of a thicker portion and sharp and thin outer portions. The body 640 thereby constitutes a rotary or stationary circular wing. It may act as a wing, when it gets a certain angle of attack relatively to the air wherethrough it moves at substantially horizontal flight. It may however also serve as a propeller holder for vertical take off and landing. The system of FIG. 12 is one of those which are very easily controlable. The pilot may control a hydraulic valve-lever or a remote control thereof for actuating a pair of hydraulic pistons in hydraulic cylinders or a pair of rotary fluid motors 647,648 in one or the other rotary direction. Instead of hydraulic fluid motors, the motors of the motor pair 647,648 may also be air-motors, air-pistons and cylinders or electric or other linear or rotary motors. Preferred is however, that they be rotary motors with capability to revolve in both direction and with means to control the rotary motion in both directions by remote control from the cockpit and with the further condition, that the said motor revolve or act in unison, when one of the motors acts. Consequently, the multiple separated parallel fluid flows of equal rate of flow as used in this invention, are very suitable to drive and control the actions of motors 647 and 648. A connection means, preferably spindles with threads, 645 and 646 are provided for the connection of each one of the motors 647,648 with one of the rotor blades 643,644. Transmission may be provided between motors and connecters 645-646 if so desired.

Thus, an action in unison of motors 647,648 will move the propeller blades 643 and 644 with relatively to each other equal speed and with relatively to each other equal radial extension inward or outward in body 640. When that is done during revolving of the rotatable body 640, the propeller blade-extension acts as a propeller. The variability of the radial extension of the propeller-blades provides a propeller of variable propeller diameter and thereby of variable propeller-circle area "F" in line with the equations of this application. The rotary propeller disc with variable diameter of the propeller circle of FIG. 12 therefore is able to lift more at same installation of power to drive it with wide extended propeller-blades and it can transform into a disc-type wing with little resistance in air at high speed forward flight. The application of propeller-blades in a rotary disc with sharp outer edges is generally known from the literature and described in the literature. The hydrauic drive of the propeller blades in unison is however not known from the former art.

Another specifity of the rotary-propeller-carrying wing of FIG. 12 is also not known from the former art and is an object and a discovery of this present invention. That is the feature to provide the guide-chambers 641 and 642 not with only about the length of the radius of the disc through a half of the disc, but to extend the guide chambers 641 and 642 almost through the entire diameter of the disc-body 640. That is obtained by placing the guide chambers 641 and 642 not along an equal axis through the centre of the disc-body 640 but to replace them parallel to each other away from the centre of the disc 640. Thereby each of the guide chambers 641 and 642 obtains a length almost equal to the length of the diameter of the disc. Such long guide chambers 641 and 642 of the invention can contain and facilitate the movement of propeller-blades of almost the length of the diameter of the disc. That makes the variable diameter propeller of big diameter and big area "F" of the propeller of FIG. 12 of the invention possible.

The figure further demonstrates, that the propeller of the former art might have extended until maximally about $0.8 = $ with $R = $ radius of the disc $ = $ out of the disc 640. But due to the invention each propeller arm of the invention may be extended with two times of $0.8 R = 1.6 R$ or 1.6 times of the radius of the discbody 640 out of the disc body 640. That gives by comparison a propeller circle area $F = ((2 (1.8 R))^2 \text{pi}/4 = (3.6 R)^2 \text{pi}/4$ of the former of art and a propeller circle area "F" of the invention of: $F = ((2(2.6R)))^2 \text{pi}/4 = (5.2 R)^2 \text{pi}/4$.

Thereby it is shown, that the variable propeller diameter rotary propeller-carrying disc of FIG. 12 of the invention has a far greater lift and carrying capacity at vertical flight, vertical take off and landing as well as at hovering and at move.

The arrangement of the propeller-guide chambers and propeller blades in accordance with the rules of FIG. 12 is thereby an important improvement of propeller-carrying disc-shaped wings. The former art discus shaped propeller carrying wings could not succeed in practical application. They had too big diameters themselves and provided too small diameters of propeller-circles for vertical flight, landing, taking off, inclined move and for hovering.

The very considerable increase in propeller-circle area and also in lifting capacity will become aware by the calculation of the relation $(5.2)^2/(3.6)^2$ which gives 2.086. Therefrom follows, that the propeller-circle area of the invention of FIG. 12 is about 2.1 times bigger than that of respective devices of the former art. An increase of 2.1 times propeller circle area gives according to the equations and according to "Handbook of my Flight-Technology" a 1.28 times higher lifting capacity at the same power installation. At same time the relation of propeller-stream diameter to resistance diameter is better than in related devices of the former art.

Preferred is the operation of the driving motors 647 and 648 by fluid motors, which are set into fluid streams of equal rate of flow, like at the propeller-drives of the application. Thereby not only a simple remote control from the cockpit can be obtained, but also a reliability of equal and to each other parallel outwards or inwards movement of the propeller-blades can be enforced and guaranteed.

An aircraft may be applied with one single propeller-carrying rotary disc wing of FIG. 12 or with a plurality of them. The discs themselfes may be driven to revolve by a respective fluid motor. When pluralities of propeller-carrying rotary wings are applied in an aircraft, they should be placed at pairs symmetrically of the body of the aircraft and the discs should be revolved by fluid motors, which are driven by separated flows of equal rate of flow, so, as other propellers of the present patent application are driven.

FIGS. 14 and 15 show another example of the fastening of a fluid motor and of a wing portion on the pivotable or even on a non-pivotable fluid-pipe-structure of the invention. When the structure is fixed, which means, non-pivotable, it carries the fluid motor(s), propeller(s) and the respective wing portion(s) of a substantially horizontally flying aircraft of my U.S. Pat. No. 3,823,898. The structure of FIGS. 14 and 15 as well as the fluid-pipe-structure of FIG. 3—without the pivot-bearing arrangement can therefore be applied also in not-vertically taking off aircraft of the fluid drive system of my U.S. Pat. No. 3,823,898 and similar aircraft. The fluid-pipe-structure, herein often simply called "structure" is however a novelty of this present invention, regardless, if that of FIG. 4 or that of FIGS. 14 and 15 is concerned. One specific feature of the structure of FIGS. 14 and 15 is, that the fluid pipes are entirely straight pipes without bows. They can therefore be very easily cleaned and they are very inexpensive in production. The fluid motor 461 has respectively a number of fastenings and/or of ports corresponding to the number of fluid pipes applied. In the sample of FIGS. 14 and 15 there are four fluid pipes 463 to 467 arranged on the corners of a rectangle or of a square. Respective ribs between the pipes may be set. Two of the fluid lines in these figures are delivery fluid lines and the other two are return fluid lines. Half-profile ribs, namely upper profile ribs 467-A and bottom profile ribs 467-B are moved from above and from bottom respectively over the fluid-pipe structure. Medial connection ribs 467-D are then set over portions of the upper and bottom profile ribs 467-A and B and they are rivetted, bolted or welded to them, in order to keep them together and thereby to hold the profile ribs on the structure. The outer cover sheet 468 is then moved over the plurality of profile-ribs 467-A-B, whereby the wing portion 460 becomes a complete and fastened wing-portion, borne by the structure and carrying the structure and the craft in horizontal flight. When the system of these figures is used in a vertically take-off capable craft, the propellers are carrying the wing portions and the craft at vertical hovering or flight. In the Inter-Thrus-Range of move the respective propeller(s) and wing portion(s) may then carry the craft together. FIG. 14 is a cross-sectional view through FIG. 15 along the line XIV—XIV. The profile rib portions 467-A and B may define the airfoil-cross-sectional size and configuration of the wing portion 460. They are preferred to have outcuts which fit precisely around the outer faces of the respective fluid lines of the fluid-pipe-structure. The fluid pipes may be fastened onto the fluid motor 461 by bolts and carry the motor thereby. The motor 461 carries a propeller 462 and drives the same. Thus, the complete holding and driving mechanism of the fluid motor, of the propeller and of the wing is of a most simple and not expensive structure consisting of straight pipe portions, plane rib-profile-plates and an outer wing-cover together with bolts and/or rivetts.

Figure 19:
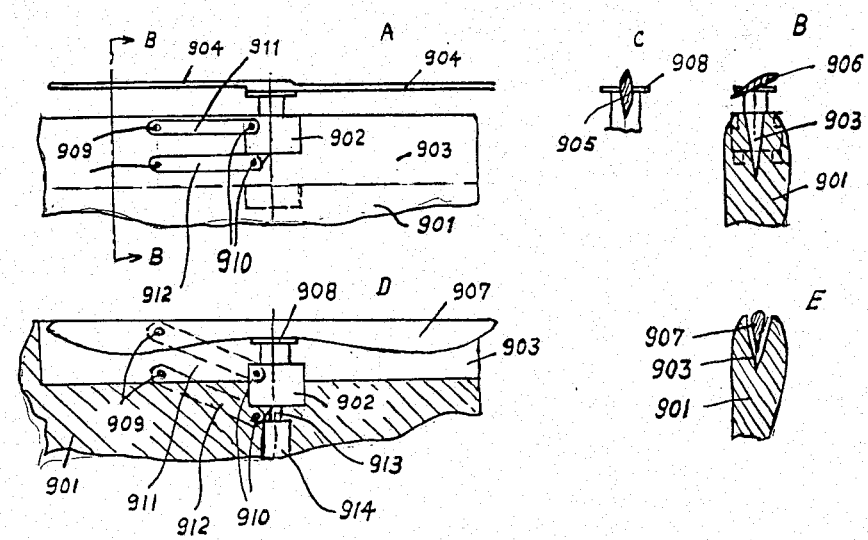
FIGS. 19 (A-E) show a pivotable propeller with pivotable propeller-blades for the retraction into a slot in a wing or body.

In the embodiment of FIG. 19 a retractable propeller 904 is shown, which may be a propeller with highly adjustable pitch, for example a propeller of a motor-glider-system with a sailing pitch position. At such extreme position the propeller pitch is set to be parallel to the direction of flight. This propeller pitch position is shon in part 6 of the figure in the cross-sectional view along B—B of part A of the figure. Part B of the figure shows a propeller-pitch of usual flight position, when the propeller tracts the aircraft forward. In this position the propeller 906 has an angle of attack or pitch of several degrees relative to its movement through the air in order to apply a trating effect to the craft. The propeller pitch position 905 of part C of the figure is the position of smallest resistance during flight in the air. This position is used in motorgliders, when the engine is shut off and the craft exclusively sails without engine support. Propellers of this kind are commercially available and they reduce friction of the craft during flight very considerably. However, according to the invention the resistance can be further reduced, when the propeller will be completely retracted into a respective slot, for example into slot 903 on the tip of the wing 901. Consequently, according to the invention, a slot-chamber 903 is provided at a suitable place of the craft, for example in the front-tip of the wing 901.

The motor, for example fluid motor 902, which carries and drives the propeller 904, is fastened by such a means in or on the respective place, for example on the wing 901, that the fluid motor 902 together with the propeller 904 can be set into two extremes of positions, namely into a forward position for operation of the propeller in flight and into a retracted or rear position when the propeller rests completely within the slot space, for example in the wing, in order to prevent any resistance of the propeller in flight. The fastening may for example be done by arms 911,912, which swing on holders 909 and 910 which are provided in the aircraft or on the fluid motor 902 respectively. A forward and backward movement device which may for example consist of a piston 913 and a cylinder 914 may be provided between the craft and the motor 902 in order to move the fluid motor 902 with propeller 904 into the forward operation position or into the rear rest position in the slot 903. It may be operated by remote control from the cockpit in any suitable manner, for example by a hydraulic control fluid flow. The motor 902 corresponds to an USA patent application of the inventor and is provided with control means for the variance of the propeller-pitch by remote control from the cockpit or by automatic control depending on the rpm of the propeller 904 and of the rotary parts of motor 902.

The propeller 904 is revolved by the motor 902 only then when the fluid motor 902 and propeller 904 are set into the forward or operating position. For retcraction of the fluid motor or motor 902 into the rear position and thereby retracting the propeller 904 into the slot-chamber 903 the motor 902 is stopped before and the propeller 904 is arrested in a position parallel to the slot chamber 903. The propeller 904 is further before it becomes retracted into the slot chamber 903 for rest, pivoted into the pitch 905 parallel to the move or flight of the craft. When these adjustments have been done the propeller 904 can together with the fluid motor 902 be retracted into slot 903 by moving the drive means 913 backwards and thereby swinging the holding arms 911 and 912 backwards. The final location and position of rest in the slot 903 is shown in parts D and E of the figure. The propeller has now the location 907. Flange 908 holds the propeller 904 in a common way. Instead of holding and moving the motor 902 on arms 911,912, the motor 902 may also be guided in a space as in FIG. 16 or may be held and moved in any other suitable way by suitable holding and moving means.

It is preferred to provide rectractable propellers again in pairs symmetrically to the body of the aircraft.

Figure 17:
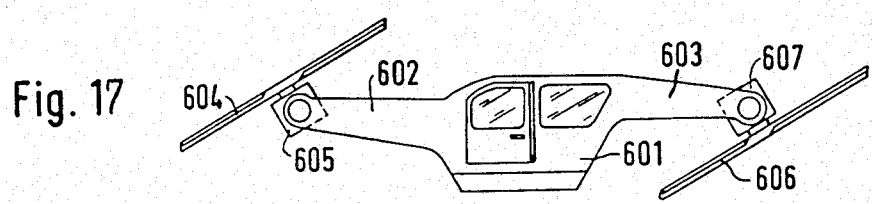
FIG. 17 shows an embodiment of a vehicle from the side.
Figure 18:
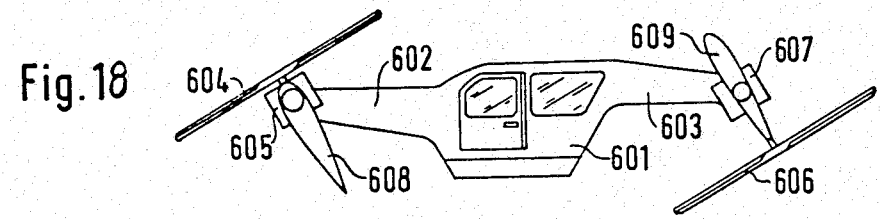
FIG. 18 shows the vehicle of FIG. 17 with pivoted propellers.

The rotary propeller-carrying disc-wing 640 of FIG. 12 may also be provided with windows 666 through the body of the disc which then should be able to be opened and to be closed. When the disc works as wing at flight, the window 666 will be closed. But when the disc works as carrier of the vertically lifting propellers, the windows 666 will be opened. The air can then flow downward through windows 666 and thereby reduce the resistance of the disc to the airflow in substantial vertically downward direction. FIGS. 17 and 18 show further examples of vertically taking off and landing aircraft of the invention. Again, as FIG. 3 can do, the craft of FIGS. 17 and 18 may, under the condition that the diameters of the propellers are not too big, also take off and land substantially horizontally. The body 601 of these craft has a front-arm 602 and a rear-arm 603. On the ends of these arms are swing-bearing housings provided. Each swing-bearing housing bears a bearing body, which is able to pivot in the bearing housing and which carries a fluid motor 605 or 607. The power plants and the pump sets are located in the body 601 of the craft. The fluid lines are not shown in the figures, but they extend from the pump sets through the respective arm and through the respective bearing housing and the respective bearing body to the respective fluid motor and the return fluid lines extend from said motors in the opposite way to the respective entrance ports of the pump sets. The extensions of fluid lines through pivotable holdings of fluid motors is in detail described in the inventors U.S. Patent application Ser. No. 800,756. Preferred and important is, that at vertical flight the front propeller 604 is fastened on fluid motor 605 above the front-arm 601, while on contrary thereto the rear propeller 606 is fastened below the fluid motor 607 of the rear-arm 603 at vertical flight. In order to have the propellers at equal hight above the ground it is preferred to set the rear arm 603 consequently higher than the front-arm 602. The front propeller 604 is thereby a traction propeller while the rear propeller 606 is a thrusting propeller. For horizontal move the craft of FIG. 17 operates in the Inter-Thrust-Range, which means, that it does not "fly", but "move". The propellers are then tilted forward about so, as shown in the FIG. 17. The degree of tilting may be a few degrees to 45 degrees and for high-speed racers even until 60 degrees. A stiff inclination or high degree of forward tilt will result in a high speed which can even be higher than the speed of craft which have wings. But the high degree of forward pivoting of the fluid motors and the propellers will also result in a very high fuel consumption. At an economic flight with low fuel consumption and low or medial speed, the propellers are tilted forwardly only slightly. An extensive chapter for the mathematical and technological details of this craft is again available in the "Handbook of my Flight-Technology". The craft of FIG. 17 is borne and driven by the propellers only. It has no wing-portions.

On contrary to the craft of FIG. 17 the craft of FIG. 18 has wing portions 608 and 606 fastened to and borne by the respective fluid motors 605 and 607. The craft of FIG. 18 can therefore pivot the fluid motors, propellers and wings until into the horizontal position. In horizontal flight the craft of FIG. 18 can therefore fly and be borne on wings 608 and 606 while the craft of FIG. 17 is borne exclusively by the propellers 604 and 606.

Since the craft of FIG. 17 has no wings it can be less expensive than the craft of FIG. 18. Since it has no wings it also does not experience the resistance in flight which wings produce. It is therefore also interesting for high-speed and for sports-flying. Since it can not do an emergency landing on wings it is preferred to use fluid motors and propellers with auto-rotation facilities to assure automatic emergency landing probabilities. Again, the craft of FIG. 17 may have propellers of bigger diameters than that of FIG. 18. The bigger diameter propellers will lift more weight and do it economically, while smaller propeller diameters on the craft of FIGS. 17 or 18 will result in installation of higher power, higher speed, less resistance in air, but also in a higher fuel consumption and thereby in a more expensive operation.

In FIGS. 17 and 18 only two propellers per craft are shown. The teaching of FIGS. 2 and 3 however also show, that also the craft of FIGS. 17 and 18 may get more than two propellers. The then arms 602 and 603 are respectively formed to be able to carry each arm more than one propeller and fluid motor. Such plural propellers may then be set in propeller pairs right and left of the medial vertical face of the craft.

While FIGS. 17 and 18, if they have no wing portions 606,608 may fly with the fastest forward speed, such fast forward speed also has it's disadvantages. The power required to keep the craft at level, when the angle of inclination is great, is very high. Thereby the craft consumes a lot of fuel. Because it flies uneconomically. Details thereof can be studied in the mentioned Handbook of my Flight-Technology.

For individual flyers with no big money budgets, it is therefore recommended to use the craft of FIG. 18 with wing portions 606,608. Because then the slower forward speed on the wing portions or partially on the wing portions and partially on the propellers will save fuel and money.

Figure 20:
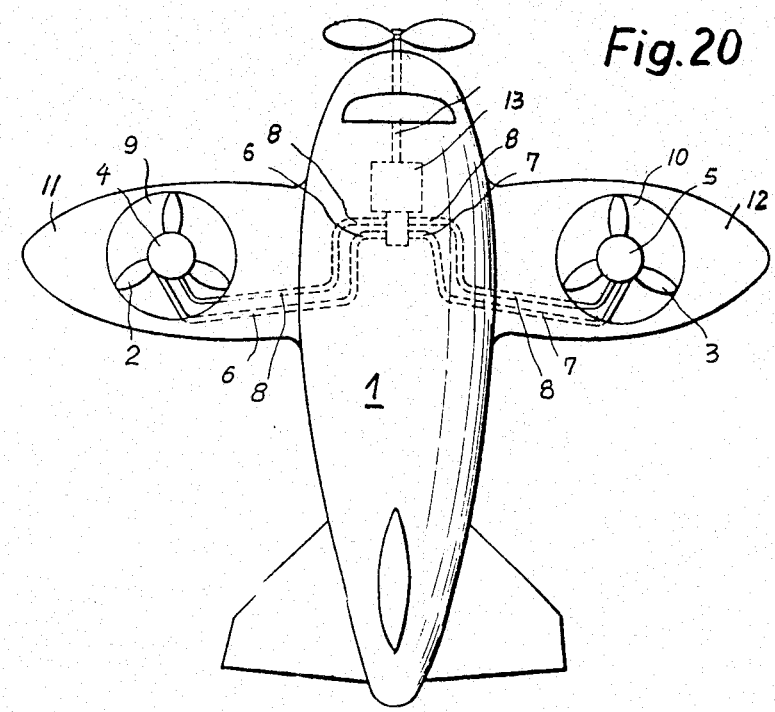
FIG. 20 shows an aircraft seen from above and this is the craft of my oldest claimed priority for a portion of the present invention.

FIG. 20 shows an aircraft seen from above, with two propellers with vertical axes in the wings. This is my eldest priority application of December 5, 1965 and now seen in my patent 3,320,898. This patent explaines in detail, how separated flows of equal or proportionate rate of flow can be produced and utilized to synchronize the counter rotating propellers of a propeller pair for equal angular rotary velocities and thereby to keep an airborne craft stable in the air or in flight. The mentioned patent may help to find the basic technology, which is utilized in the present invention.

Figure 21:
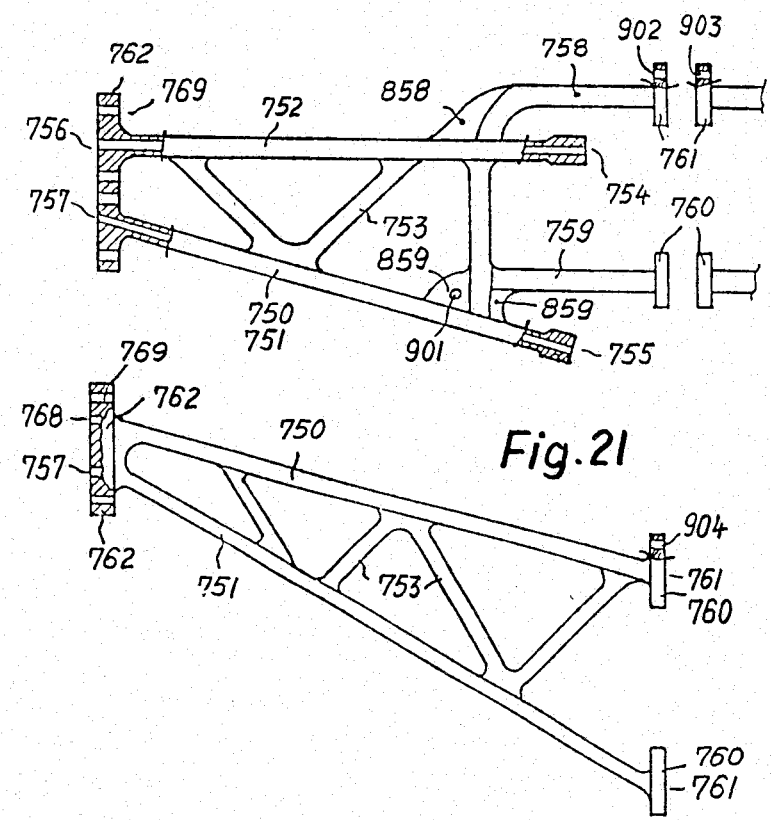
FIG. 21 shows a pipe structure of my co-pending patent application Ser. No. 421,186 whereby this structure may also be utilized in the present invention.

FIG. 21 shows the system of the preferred pipe-structure which might be used in the present invention. This pipe structure is with FIG. 21 a figure of my co-pending application. Of importance in the present invention is, that the wings of the craft of FIG. 4 and of many others of the FIGS. require at least three substantially parallel, but slightly relatively to each other inclined, if so desired, pipes and diagonal ribs therebetween to secure a rigid structure able to do the duties, which are expected of it. In FIG. 21 the pipes are shown farther from each other distanced, as that will be the actual case in the present invention. By the farther distancing of the pipes of the structure from each other in FIG. 21, it is more clearly seen, how the pipes and ribs are to be set in principle. The FIG. also shows, that the pipes have no or a maximum of one bent per pipe in order that the interior spaces of the pipes can be cleaned from dirt and welding dirt from both open ends of the pipes.

Differently from the structure of FIG. 21, the pipes in the present invention must be closer together, in order that at least three pipes per structure can be kept within the wing(s) of FIG. 4, within the arms 602,603 of FIGS. 17 and 18 and respectively in the other Figures. In FIG. 20 the aircraft 1 has a power plant 13, which produces two flows of separated outlets with equal rate of flow through separated fluid lines 6 and 7 to motors 4 and 5, which carry propellers 2 and 3 in ducts and 10 in wing portions 11 and 12. The mentioned patent describes in detail, how the separated flows with equal rate of flow are created by means 13. The importance is, that this priority patent discloses, that the equal rate of flow in separated flows is utilized to drive the motors 4,5 and thereby the propellers, 2,3 which are borne by the shafts of the motors, with equal rotary velocity. That is the basic principle, which is also used throughout the present invention.

FIG. 21, which shows the structure with farther from each other, but substantially parallel fluid flows leading pipes 750 to 752, namely at least thre such pipes. In one of the upper or bottom portions of the figure, the pipe structure is schown as seen from the side and in other, as seen from above. Each fluid flow leading pipe 750,751,752 has on each a port 756,757,768,754,755,761. In the figure the ends of the pipes have also connecters 762,760, which might have bores 769,904. Such connecters are however not in all embodiments of the present application required. What however is required, is, that the ribs 753 are fastened to the said pipes, preferredly diagonally, but in any case of the embodiments of the invention in the direction of the appearing stresses, or in such a style, that they together with the mentioned pipes are set in the direction of the appearing forces. The forces are the tractions of the propellers, the weights of the wings and of the aircraft, the resistance of the wings in the air and the lift components of the wings or propellers. It is also required to make strong fastenings of the pipes and ribs to each other, for example by the insertion of sheets, bars 858,859 into the corners, where pipes and ribs meet. Shown is also in the figure, that the sheets or corner strengtheners or the ribs or pipes may have bores 901 for the fastening of the respective wing portions or wing profil cover sheets and the like. Laterally extending bent pipe portions 758,759 should be provided, if so required.

Important is in accordance with the present invention, that the pipes, which lead fluid through them, should have a maximum of one single bent per pipe, because otherwise they can not be cleaned inside. It is important to remove any little bit of dust, dirt or welding shavings out from the inside of the pipes. That can be checked with the human eye only, if the pipe has maximally one bent.

It is further important, that, when the pipe structure carries wings, that at least three pipes with respective strength or strengthenings by ribs, are extended from the laterally extending pipe structures on the aircraft through the body of the craft to be connected to the other lateral structure of the opposite side rigidly. Because it is important, that the medial portion of the arrangement, the at least three pipes between between the lateral pipe structures, are strong and rigid enough, to rigidly hold the lateral pipe structures. This is shown in FIG. 4 and also visible in the upper portion of FIG. 10, which is a sectional view through the bottom portion of FIG. 10 along the section-arrow A-A therein. In the latter case, the pipes are straight pipes 441,442,443, 444. When the pipes are straight pipes without bends, it is required to weld connection pipes 544,644 onto them as connectors or ports for the entrance or exit of fluid. The mentioned connection pipes are then also fluid leading pipes and they are for example shown in FIG. 10. They are strengthened relative to the pipe structure by corner sheets or inserts 958. It is important here, in accordance with the invention, that the connecter pipes 544,644 have then maximally a single bent per pipe, because otherwise, the interior cleaning would not be possible or not be observable.

Important further is, that the distances of the pipes normal to each other and normal to the axes of the pipes are bigger than the diameters of the pipes, but smaller than the wing portion or body portion, wherein they are applied, or for which they provide the bone structure. The distances of the pipes from each other and the angles of the ribs and corner sheets are important means of the invention and they must be done under consideration of the values of strengthes and of the directions of strengthes as well as under the desire to keep the weight to a minimum in order to maintain the object of the invention, to have the strongest structure and strongest power at the smallest weight, due to the use of the fluid pump, motors and the pipe structure, which holds the wings or body-portoons, motors and the propellers of the motors, while at same time providing the strength and holding of the wing portion, or body-portion and at the same time to be included in the drive of the motors and in the transfer of power by leading the fluid to and from the fluid motors.

FIG. 10 demonstrates further, that an upper body portion 460 may connect the holders 448 and 449 of the craft. The holders 448 and 449 form bores along equal axes on the left and right side of the body or body portion 460. As seen in the top portion of FIG. 10, the bearing bodies 427 are set into the bores of the holding portions 448 or 449 respectively. Structure pipes 441 and 444 extend through the bearing bodies 427. The bearing bodies 427 may be pivoted in holders 448 and/or 449 respectively if so desired. If the structure pipes 441 and/or 444 are fluid line pipes, the connectors or ports 544 or 644 may be set and ribs 958 may be provided or be strengtheners if so desired.

FIG. 22 shows together with FIG. 23 a modification of my aircraft and thereby another embodiment of the invention. It has a main pipe 104 which is pivotably borne in the body of the craft. The medial portion of pipe or carrier 1014 is in the Figures provided with a wider portion 1004 which may be a surrounding pipe portion of a bigger diameter. The medial portion 1004 is pivotably borne in bearing housings 1005 and 2005 on the left and right wall of the body 1001 of the craft. As FIG. 22 shows, a drive mean, like a cylinder 1024 with a piston 1023 is borne by member 1025 in the craft 1001. The other end of the drive means 1023-1024 is connected to a portion of the structure, for example to pipe 1015. Moving piston shaft 1023 in cylinder 1024 inwards or outwards will thereby define the pivotal movement of the main pipe 1014 with 1004 in bearings 1005,2005 and thereby define and control the angle of the wing portions 1016,2016 and/or of the motors 1002,2002 and propellers 1003,2003 or the aircraft. The rear ends of the wing portions may carry the wheels 1027 by holders 1026. When the wing portions, propellers and motors have about an angle relatively to the ground as shown in FIG. 22, the craft is very effective for short take off and landing. If the axes of the propellers are inclined relative to the wing portions to create a lift of the wing by the air which is blown by the propeller over the wing, the craft may even take off and land vertically. The wheels 1027, however, permit a rolling on the ground and may be of convenience, when space for short take off or landing is available. The at least three pipes or two pipes plus a strengthener, are shown by referentials 1014,1015 and 1022. Parts 1015 and 1022 may swing through openings in body 1001 when the arrangement is pivoted. The pipes are provided with the ribs 753 as usual in the other Figures of the application. The holders 1017 are extensive provided in order to permit plural holding bores or threads 1018,2018 for fastening the wing portions with tplural fasteners onto the pipe structure. Pipes 1014 and 1015 extend through the body 1001 of the craft from one motor 1002 on the right side to another motor 2002 on the left side of the craft and they carry by holders 1017,2017 the wing portions 1016 and 2016. On the outer ends the pipes 1014 and 1015 have holding plates 1021 and 2021 with preferredly plane faces which are normal to the axes of the pipes 1014 or 1015. Thus, the pipes 1014 and 1015 form straight pipes with straight interior fluid lines along unbent axes. The pipes can thereby be cleaned from the ends without difficulties. In the middle of the pipes, the interior stoppers 1009 are inserted closely fitting into the interior of the pipes or at least into pipe 1014 or pipe 1015. Thereby the interior of pipe 1014 is, as seen in FIG. 23, divided into two separate fluid lines, one to the right motor 1002 and one to the left motor 2002. Entrances or ports 1010 and 1011 are provided on a medial surrounder 1006 to pass separated flows of fluid separately and individually to the fluid motors 1002 and 2002. If the medial wider portion is a hollow pipe 1004, there should also be stoppers 1008 be provided in the middle of the medial portion 1004 to separate the ports 1010 and 1011 and the flows therefrom into the separate fluid lines of the right and left portions of fluid line pipe 1014. The fluid motors 1002,2002 may be provided with bearing holders 1020,2020 to hold bearings 1019,2019 for long shafts of the motors, which carry and drive the propellers 1003 and 2003 2003 respectively.

By the embodiment of FIG. 23 a fluid pipe structure is obtained, which can be fully and effectively cleaned inside and which needs no bends. At the same time it holds the motors effectively. This structure is easy in manufacturing and reliable in operation.

FIG. 24 demonstrates an alternative portion of the fluid line structure. It is similar to the upper portion of FIG. 10. The straight pipes 1028 and 2028 are borne in the holders 1030 and 2030 of aircraft body 1001. In the middle of the pipes are inside the separators or stoppers 1031 provided. They are set fast in the pipes to prevent movement of the stoppers 1031 inside of the pipes. Ports 1032 and 1033 are set or welded onto pipe 1028 to lead separated flows individually into or out of the right and left fluid line portions of pipe 1028. Similarly the ports 1034 and 1035 are set or welded onto pipe 1029 to lead the flows of fluid individually into the respective fluid line portions. Thus, we have individual port 1032 to fluid line 3028, individual port 1033 to individual fluid line 4028, individual port 1034 to individual fluid line 3029 and individual port 1035 to individual fluid line 4029. Again, the arrangement of FIG. 24 is obtained by simple straight pipes and the interior of the pipes can be effectively cleaned from remainders of weldings or dust.

Figure 25:
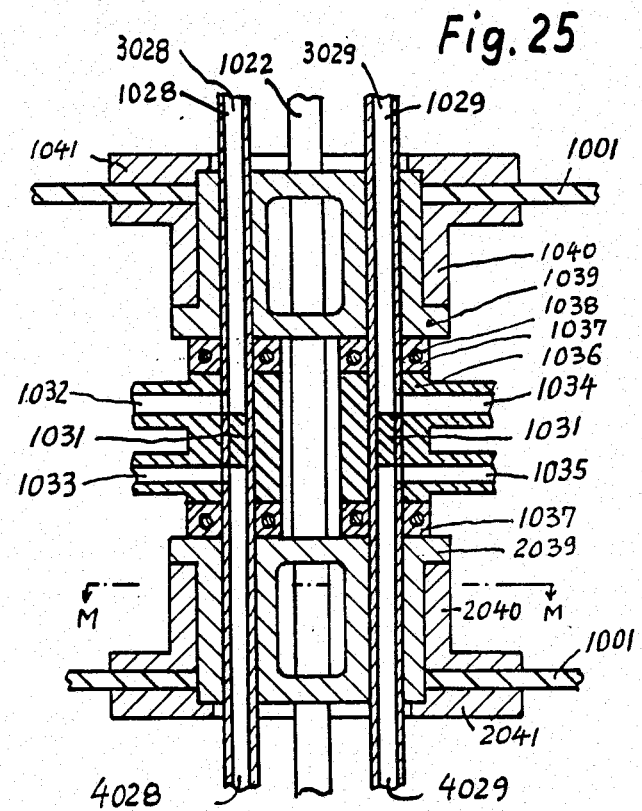
FIG. 25 shows a sectional view through another alternative structure.
Figure 26:
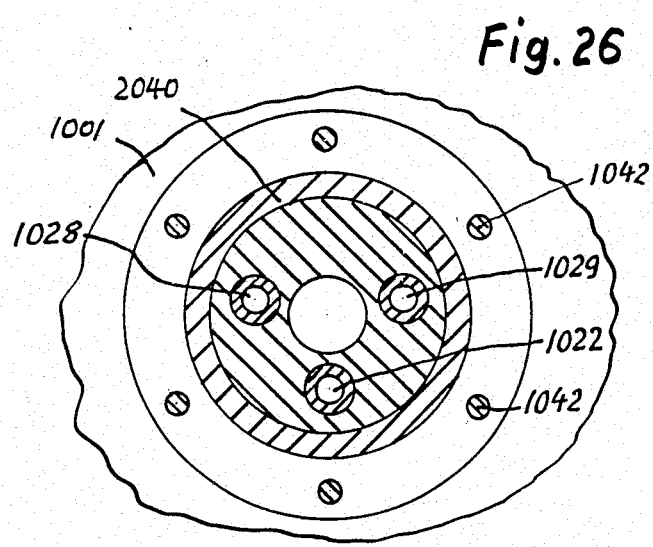
FIG. 26 is a sectional view through FIG. 25 along the line M—M therein.

FIGS. 25 and 26 show in a larger scale the medial portion of another embodiment of a pipe structure of the invention. The straight pipes 1028 and 1029 have again the interior divider, separator or stopper 1031 individually. The ports 1032 to 1035 are provided on a medial body 1036 and they serve equal purposes as in FIG. 24. The ports form again individual and separated ports for the individual and separated fluid lines 3028,4028 and 3029,4029 in in fluid pipes 1028 and 1029. On the outside of pipes 1028 and 1029 laterally of the medial body 1036 the holders 1037 may be fastened by bolts or other fasteners 1038 to the pipes 1028 and 1029 respectively to prevent lateral movement of the medial body 1037 on the pipes 1028,1029.

The pipes 1028,1029 extend through a bearing body 1040 and another bearing body 2040. The third pipe 1022 may also extend through these bodies, as FIG. 26 indicates. FIGS. 25 and 26 belong together, because FIG. 26 is a section through FIG. 25 along the arrowed line M—M. The bearing housings 1040 and 2040 are set around the bearing bodies 1039 and 2039 respectively to bear therein the bearing bodies 1039,2039. The outer skins 1001 of the body of the aircraft may then be fastened to the bearing housings 1040, 2040 or additional holders 1041,2041 may be set from the outside onto the body 1001 and be fastened through the body portions 1001 to the housings 1040,2040 respectively by respective rivetts or bolts 1042. See hereto FIG. 26. The arrangement of these Figures can spare welding on the medial portions of fluid line pipes 1028 and 1029 or 1022. This arrangement thereby prevents disturbance and dirtying of the interiors or the medial portions of the structure pipes 1018,1029 and/or 1022. Again, the straight pipes with straight axes without bends can be cleaned effectively inside to obtain clean fluid line portions.

Figure 27:
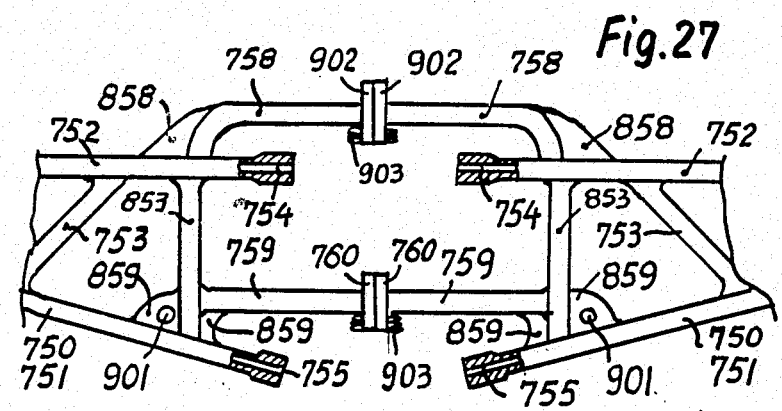
FIG. 27 shows two structures of FIG. 21 fixed together to a common structure.

FIG. 27 shows two fluid pipe structures of FIG. 21 bolted together in opposite directions by plural bolts 903. An effective pipe structure is thereby obtained to carry propellers and/or wings with motors on opposite sides of a vehicle. The ribs 853 have obtained the missed numeral 853, which is not present in the parental application.

Figures 28, 29:
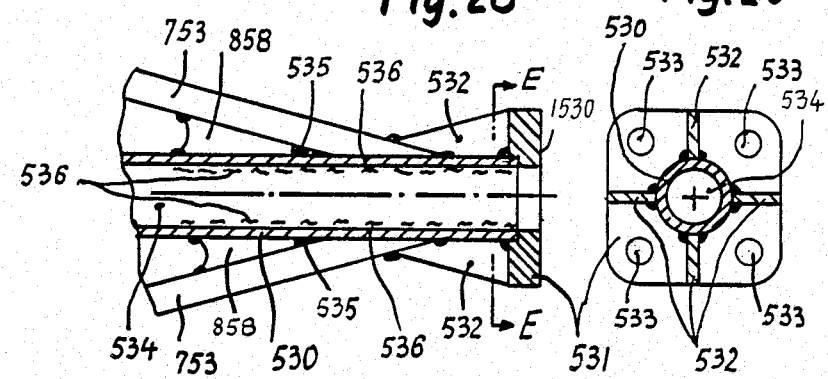
FIG. 28 shows a portion of a structure of the invention.
FIG. 29 is a sectional view through FIG. 28 along the line E—E of FIG. 28.

FIGS. 28 and 29 demonstrate in a larger scale, approximately in the 1:1 scale of a light aircraft, the outer end of a respective fluid line pipe 530 of a fluid line pipe structure of the invention. The holding plate 531 is welded onto the respective outer end of pipe 530 and forms the radially plan holding face 1530 on the end of the structure. Face 1530 is bolted onto a respective complementary plane face of the respective fluid motor to set the end of the interior 534 of the pipe onto the respective port of the fluid motor. The bores 533 are extended through the end plate 531 to set the bolts therethrough and into the respective threads of the fluid motor. The end plate 531 is strenthened by ribs 532 which are welded onto the plate 531 and onto the end portion of the pipe 530. The ribs 753 are also welded onto the pipe 530 as already known from others of the Figures. The strengthening holding plates 858 are welded between the pipe 530 and the ribs 753 of the structure. By these weldings the interior face of the wall of pipe 530 becomes welding particles 536 inside of the pipe, which dirten the interior portions 536 of pipe 530 and which would mix the fluid which flows through the pipe. This dirt would then disturb the fluid motor(s) and the fluid pump(s), if the interior 534 of the pipe 530 would not be cleaned. These Figures demonstrate, how important it is, to build straight pipe ends and straight pipes or pipes with maxially one bend in order to be able to clean the interiors 534 with interior portions 536 of the respective pipe(s) of the pipe structure of the invention. The welding lines between two differet pieces of material, which are welded together and which are seen in the Figure in cross-section, are shown by 535.

Figure 30:
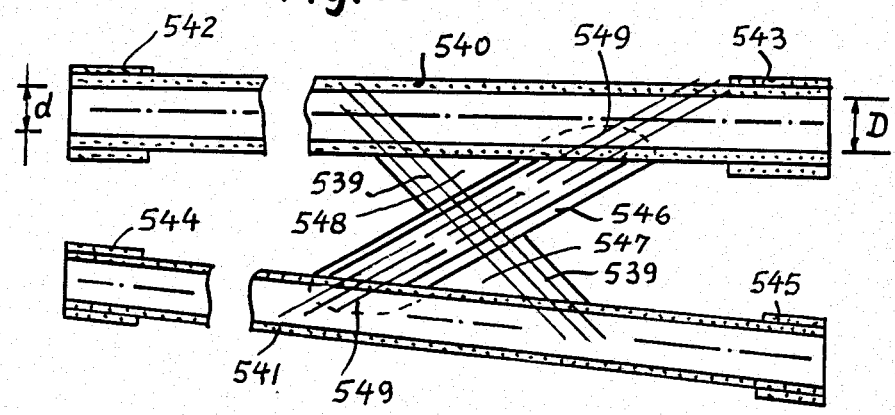
FIG. 30 shows another structure of the invention in a sectional view.

FIG. 30 demonstrates a pipe structure of the invention which is not welded but entirely glued. This embodiment of the pipe structure may be made by metal, plastic or fiber reinforced plastics. For example, this pipe structure of the invention, may be produced by carbon fibre. The fibers are wound around a bar which is slightly tapered to form one end of a slightly bigger diameter "D" and another end of a slightly smaller diameter "d". The fibers are then glued with the respective glue, for example, with epoxy resin. After drying of the fiber-glue 540 the inner bar is removed in the direction of the wider portion "D" whereby the hollow pipe(s) 540 and/or 541 appear(s). The ends of the pipe(s) may be thickened by further layers 542,543,544 or 545 of fiber and glue in order to obtain bigger ends for fastening of the pipe structure onto motors, holders, bodies, pumps and the like. Diagonal ribs 546 are then glued between pipes 540 and 541 to obtain the rigid structure of the invention. To hold these ribs very strongly, fiber layers 549 are glued over the rib and the respective portions of pipes 540 541 as shown by the directional lines of fibers 549. Stregthener plates 547 may be glued between the respective portions of the pipes and the respective rib. These may be additionally fastend and strengthened by fiber layers 539 in the direction of the lines 539. By the structure of this Figure and by the obeying of the production methode, here described, a very strong and inside very clean pipe structure is obtained which effectively can be used as a fluid line pipe structure of the invention.

The pipes of the structures of the invention have been shown in the Figures as round pipes, but the pipes could also be of other cross sectional configuration, for example four cornered, sixangularly six cornered or better, with rounded corners.

FIGS. 31 to 33 demonstrate the fastening of straight pipe structures in oppositional directions to a medial block 550. Block 550 has the fluid lines and ports 551 to 554 which port into the interiors of the fluid lines 750,751 respectively. The pipes have here again inner and outer end plates 1531 and 531 to be fastened therewith onto the medial block 550 and onto the respective fluid motor 1002 or 2002. The structure has the diagonal ribs or other ribs 555 or 558 which may also form the holders for holding thereon the respective wing position. FIG. 32 shows the holder 555 with bores 556 and 557 to set bolts through the bores 556 and 557 to fasten with these bolts the respective wing portion or propeller portion on the pipe structure 750 to 752. FIG. 33 shows the interiors 1750,1751 of the pipes which form the ports of the ends of the pipes to be set onto the medial block 550 or onto the motor 1002 or 2002 respectively. The bores 559 in the plates 531 or 1531 are provided to set bolts therethrough for the fastening of the end plate of the respective pipe onto the respective motor 1002,2002 or the respective medial block 550.

FIGS. 34 to 36 show a pipe structure in its natural configuration as used in wings or propellers of the invention. The Figure demonstrates, that the pipes are laterally distanced from each other with distances which exceed the diameters of the pipes. While in FIG. 21 the pipes are shown laterally widely distanced, this wide distance is shown only to see the details in the Figures clearly. But actually the pipes are closer together to find place in the wing or propeller. This is an an about scale shown in FIGS. 34 to 36. The structure of FIG. 21 is thereby merely for multi propeller helicopters of the invention, while the dimensioning of the structure of FIGS. 34 to 36 is merely for use inside of the wing or of the propeller of the respective craft. Ribs, plates and pipes are similar to those of Figure 31 or FIG. 21 in function and they need no repetition of the description here. FIG. 36 shows the location of the pipes in the sectional view of the arrowed line H—H of FIG. 34, whereby it is also made clear, how the ribs 753 are provided between the three pipes of this structure embodiment of the invention.

Figure 37:
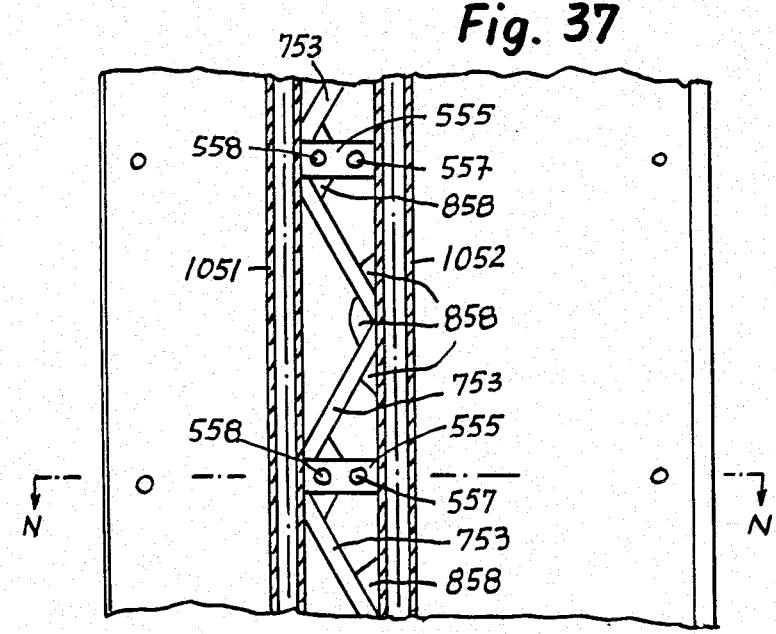
FIG. 37 is a sectional view through an airfoil of the invention.
Figure 38:
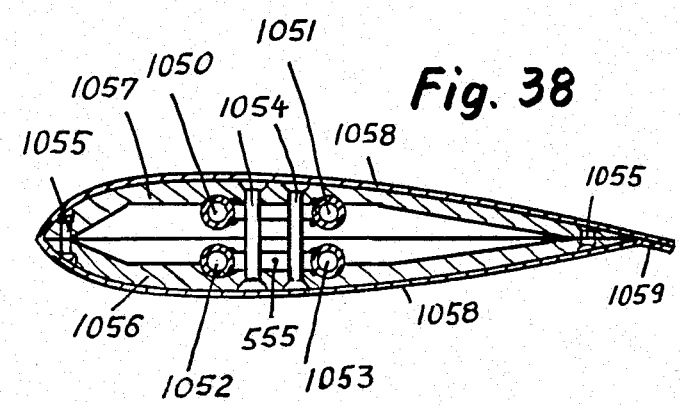
FIG. 38 is a sectional view along the arrowed line N—N of FIG. 37.

FIGS. 37 and 38 show another means of fastening a pipe structure of the invention to a propeller or to an aircraft wing or to a fluid borne craft wing. The pipe structure has plural pipes 1050 to 1054 or at least two thereof. Fastener plates or bodies 555 are fastened to the pipes. It is preferred to weld or glue them to the pipes. The fasteners 555 are provided with bores 557,558. The propeller or wing is formed by an upper portion 1057 and a bottom portion 1056. These upper and bottom portions have configuration portions which are complementary either to the pipe(s) or to the fasteners(s) 555. The bottom portion 1056 is led onto the bottom of the respective fastener(s) 555, while the upper portion 1057 is led on top of the fastener(s) 555. Rivets or bolts 1054 are then set through the bores 557,558 of the fastener and through respective bores in the upper and bottom portions 1056 and 1057. The bolts or rivet 1054 are then closed or fastened, whereby the pipe structure is fastened to the wing or propeller portions 1056 and 1057. Additional rivets 1055 may fasten the upper and bottom portions 1056 and 1057 additionally. For further strengthening and for cleaning or smoothening of the outer face of the wing or propeller, it is preferred to lay an outer skin 1058 around the entire assembly and to rivet or glue it together at the rear end 1059 of the wing or propeller. Such outer skin may also be glued and may be a fiber sheet with respective plastics like epoxy resin and the like. It is preferred to make the outer skin 1058 by a single integral sheet. The upper and bottom portions 1056 and 1057 may also be casted. They may also be fiber reinforced plastics, wood, metal or foam.

Figure 39:
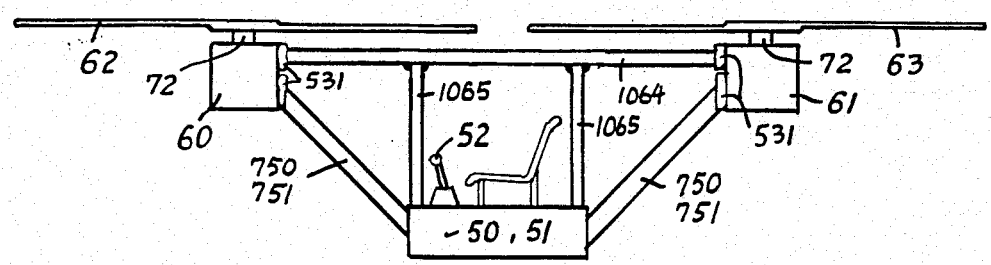
FIG. 39 is a view onto an aircraft from the side.
Figure 40:
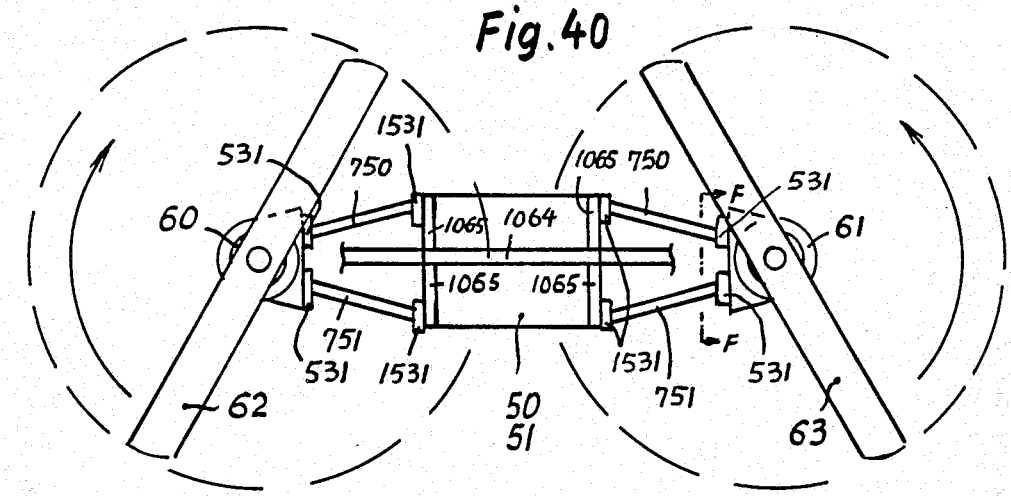
FIG. 40 shows the craft of FIG. 39 seen from above.
Figure 41:
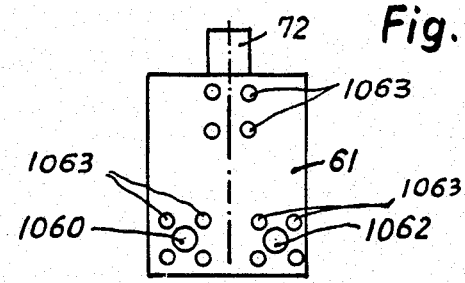
FIG. 41 shows a motor seen along the line F—F of FIG. 40.

FIGS. 39 to 41 show, that the craft of FIGS. 4 and 5 of my co-pending application Ser. No. 121,186 which issues as a patent on September 20, 1983 may also be made by a simple pipe structure of the present invention. Power and fluid flow supply plant 50,51 has plane face portions with fluid ports, whereonto the end plates 1531 of the structure of FIGS. 31 to 36 are fastened. Fluid lines 750 and 751 constitute fluid lines to the motors and from the motors and they are bolted with the other end plates 531 onto the respective fluid motor 60 or 61. A further pipe or bar 1064 which must not be a fluid line, but could under certain circumstances be a fluid line, is fastened with end plates 531 to both motors 60 and 61 to hold them straight. Ribs 1065 may be provided to give holding strength and positional strength to the cabine with controller 52 and to the entire air craft of these Figures. Fluid motors 60 and 61 drive and carry by shafts 72 the respective propeller 62 or 63 respectively. Figure 41 demonstrates the fluid ports 1060 and 1062 of the plane face of the motor 61. Threads 1063 are provided in the motor 61 to set bolts thereinto for fastening of the end plates of the pipes onto the motor and to set the further pipe or bar 1064 into the craft and onto the motors 60 and 61. The Figures of this embodiment thereby replace the bended pipes of the mentioned Figures 4 and 5 of the mentioned application Ser. No. 121,186 by a fluid line structure with exclusively straight pipes of the invention. The craft can be easily bolted together from pre-fabricated parts.

Fluid flow supply plant 50,51 delivers a first flow of fluid to the front motor 60 and a second flow of fluid to the rear motor 61. The both fluid flows are individual flows which are separated from each other and which are prevented from communication with each other. The front flow has a first rate of flow, while the rear flow has a second rate of flow. The rates of flow define a ratio of rates of flow. This ratio of rates of flow is at all times equal and it defines, that the first flow has a slightly smaller rate of flow, than the second flow. Thereby the front propeller 62 revolves slightly slower then the rear propeller 63, since the motors 60 and 61 have equal fluid consumption volumes per revolution of the respective rotor of the respective motor. That inclines the craft in a forward direction whereby the craft obtaines automatically a forward movement in the air. The mentioned ratio defines the angle of inclination and the forward speed of the craft. How the ratio is obtained, is in detail described in my granted patents of the parental and grand parental patents and/or applications. Thus, the Figures define an automatically forwardly flying aircraft, wherein the ratio defines the best economical flight speed range.

The embodiments deal partially with the extension of strong pipe structures through the body of the craft in order to carry the wings, motors and propellers on both sides of the aircraft. The aircraft of the invention have thereby obtained strong and easily to be build wings. The so provided structures may be used for fixed wings as well as for pivotable wings of aircraft or other fluid borne craft.

More details of the invention may reside in the appended claims and the claims are, therefore, as now filed to be considered as portions of the disclosure of the present invention.

What is claimed is:

1. A fluid borne craft comprising, in combination, a laterally from a body extending airfoiled wing with a drive means to revolve a propeller which is mounted on said wing, wherein said drive means and said propeller are retractable into a portion of said wing and an improvement;
wherein
  said improvement consists, in combination, in:
    (a) a slot provided in said wing along the front portion of said wing and longitudinally parallel to said wing;
    (b) a configuration of said slot complementary formed relative to the outer measures of the rear portion of said propeller;
    (c) said propeller is provided with a means to change the angle of the pitch of said propeller from an angle of attack relative to the surrounding air to an angle parallel to the chord of said wing with the rear portion of said propeller directed towards said wing at said angle parallel to said chord; and;
    (d) control means to retract said drive means and said propeller into said wing whereby said propeller when retracted into said wing is at least partially received in said slot and said control means extends said propeller out of said slot to be able to revolve in the fluid which surrounds said wing.

2. The craft of claim 1;
wherein
  said drive means is a fluid motor with a revolvable shaft which holds said propeller and which is revolvable by a supply of driving fluid which flows through said motor;
wherein
  said wing contains a reception compartment for the movement of said motor forward and backward in said compartment; and;
wherein
  holding means are provided between said motor and said wing to swing said motor forward and backward in said compartment and said propeller into and out of said slot.

3. The craft of claim 1,
wherein
  said craft has at least two pairs of propellers with one propeller of a pair on the right and the other on the left of said body; and;
wherein
  one pair of said pairs is provided with said propellers which are retractable and extendable into and from said wing portions.

* * * * *